US010213964B2

(12) United States Patent
Safai et al.

(10) Patent No.: US 10,213,964 B2
(45) Date of Patent: Feb. 26, 2019

(54) METHODS AND APPARATUS FOR REPAIRING COMPOSITE MATERIALS

(71) Applicant: The Boeing Company, Chicago, IL (US)

(72) Inventors: Morteza Safai, Newcastle, WA (US); Kimberly Meredith, Newcastle, WA (US)

(73) Assignee: The Boeing Company, Chicago, IL (US)

(*) Notice: Subject to any disclaimer, the term of this patent is extended or adjusted under 35 U.S.C. 154(b) by 660 days.

(21) Appl. No.: 14/708,158

(22) Filed: May 8, 2015

(65) Prior Publication Data
US 2016/0325490 A1 Nov. 10, 2016

(51) Int. Cl.
B29C 65/08 (2006.01)
B29C 65/00 (2006.01)
(Continued)

(52) U.S. Cl.
CPC ........ B29C 66/721 (2013.01); B29C 35/0261 (2013.01); B29C 65/08 (2013.01); B29C 65/4835 (2013.01); B29C 66/474 (2013.01); B29C 66/9121 (2013.01); B29C 66/9141 (2013.01); B29C 73/10 (2013.01); B29C 73/12 (2013.01); B29C 73/34 (2013.01); B29C 65/088 (2013.01); B29C 65/5028 (2013.01); B29C 65/5057 (2013.01); B29C 65/8292 (2013.01); B29C 66/1222 (2013.01); B29C 66/1226 (2013.01); B29C 66/472 (2013.01); B29C 66/5326 (2013.01); B29C 66/71 (2013.01); B29C 66/7212 (2013.01); B29C 66/72141 (2013.01); B29C 66/73941 (2013.01); B29C 66/81422 (2013.01); B29C 66/836 (2013.01); B29C 66/8412 (2013.01); B29C 66/86533 (2013.01); B29C 66/91216 (2013.01); B29C 66/91411 (2013.01); B29C 66/91951 (2013.01);
(Continued)

(58) Field of Classification Search
CPC ... B29C 35/0261; B29C 65/08; B29C 65/088; B29C 66/721; B29C 66/9121; B29C 66/9141; B29C 73/10; B29C 73/12; B29C 73/34
See application file for complete search history.

(56) References Cited

U.S. PATENT DOCUMENTS 6,458,228 B1 10/2002 Yoshimoto
8,330,086 B2 12/2012 Miller et al.
(Continued)

FOREIGN PATENT DOCUMENTS

EP 0850749 A2 7/1998

OTHER PUBLICATIONS

European Patent Office, Extended European Search Report in European Patent Application No. 16164824.1-1706, dated Sep. 26, 2016, 8 pages.
(Continued)

Primary Examiner — George R Koch
(74) Attorney, Agent, or Firm — Kolisch Hartwell, P.C.

(57) ABSTRACT

A method of bonding materials may comprise defining a bond interface between two materials in a cure zone on a surface of an object and heating the bond interface with sound waves. Heating the bond interface may include applying ultrasonic sound waves to the bond interface.

25 Claims, 10 Drawing Sheets

(51) Int. Cl.

| | |
|---|---|
| *B29C 65/48* | (2006.01) |
| *B29C 73/10* | (2006.01) |
| *B29C 73/12* | (2006.01) |
| *B29C 73/34* | (2006.01) |
| *B29C 35/02* | (2006.01) |
| *B29L 31/30* | (2006.01) |
| *B29L 31/00* | (2006.01) |
| *B29C 65/50* | (2006.01) |
| *B29C 73/14* | (2006.01) |
| *B29C 65/82* | (2006.01) |
| *B29L 31/10* | (2006.01) |

(52) U.S. Cl.
CPC ........ *B29C 66/951* (2013.01); *B29C 66/9512* (2013.01); *B29C 66/9516* (2013.01); *B29C 66/961* (2013.01); *B29C 66/9674* (2013.01); *B29C 73/14* (2013.01); *B29L 2031/10* (2013.01); *B29L 2031/30* (2013.01); *B29L 2031/3055* (2013.01); *B29L 2031/3067* (2013.01); *B29L 2031/3076* (2013.01); *B29L 2031/3082* (2013.01); *B29L 2031/3091* (2013.01); *B29L 2031/7126* (2013.01); *B29L 2031/7692* (2013.01)

(56) References Cited

U.S. PATENT DOCUMENTS

| | | |
|---|---|---|
| 8,468,709 B2 | 6/2013 | Akdeniz et al. |
| 8,490,348 B2 | 7/2013 | Wilenski et al. |
| 8,642,168 B2 | 2/2014 | Chakrabarti |
| 2005/0279441 A1 | 12/2005 | Warfield et al. |
| 2007/0257086 A1 | 11/2007 | Schroeder |
| 2011/0108181 A1 | 5/2011 | Cai et al. |
| 2012/0085496 A1* | 4/2012 | Klinstein ................ B29C 65/08 156/358 |
| 2014/0138012 A1* | 5/2014 | Spicer ........................ B06B 3/00 156/64 |
| 2014/0141190 A1* | 5/2014 | Shigetomi ............... B29C 73/06 428/63 |
| 2017/0057183 A1* | 3/2017 | Mayer .................... B29C 73/30 |

OTHER PUBLICATIONS

Zhou, Shuangjie, and Hawley, Martin C., "A study of microwave reaction rate enhancement effect in adhesive bonding of polymers and composites", Composite Structures, 2003, vol. 61, No. 4, pp. 303-309.

Yusoff, R., Aroua, M. K., Nesbitt, A., and Day, R. J., "Curing of polymeric composites using microwave resin transfer moulding (RTM)", Journal of Engineering Science and Technology, Aug. 2007, vol. 2, No. 2, pp. 151-153, School of Engineering, Taylor's University College.

Visvanathan, K., Gianchandani, Y., "Ultrasonic Microheaters Using Piezo-Ceramics for Cauterization and Other Applications", Solid-State Sensors, Actuators and Microsystems Conference, 2009, 4 pages.

Kwak, M., Robinson, P., Bismarck, A., and Wise, R., "Curing of composite materials using the recently developed hephaistos microwave", In 18th International Conference on Composite Materials, 2011, pp. 21-26.

TWI Limited, Novel tooling for composites curing under microwave heating—Project 'Mu-Tool', Dec. 13-14, 2011, 16 pages, Loiretech, Nantes, France.

* cited by examiner

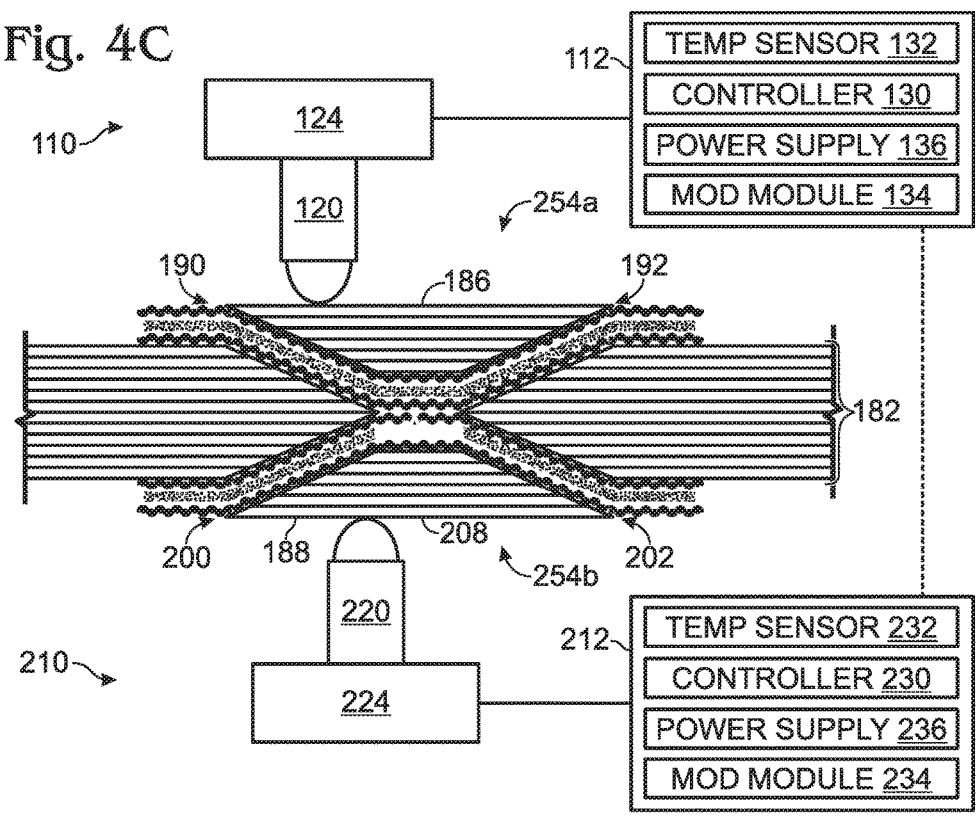
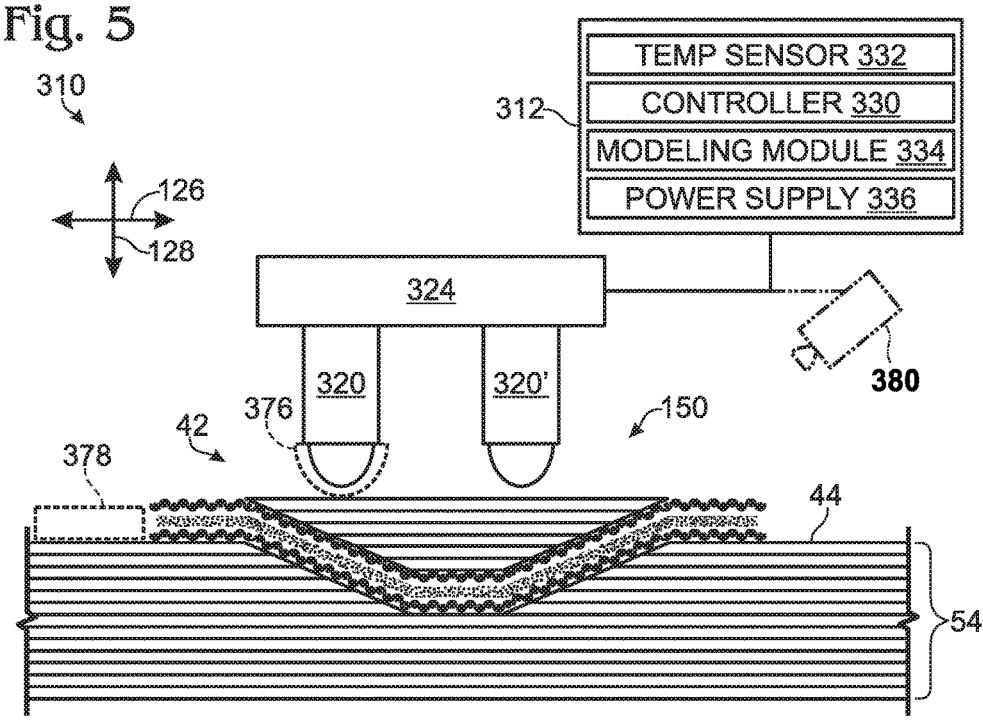

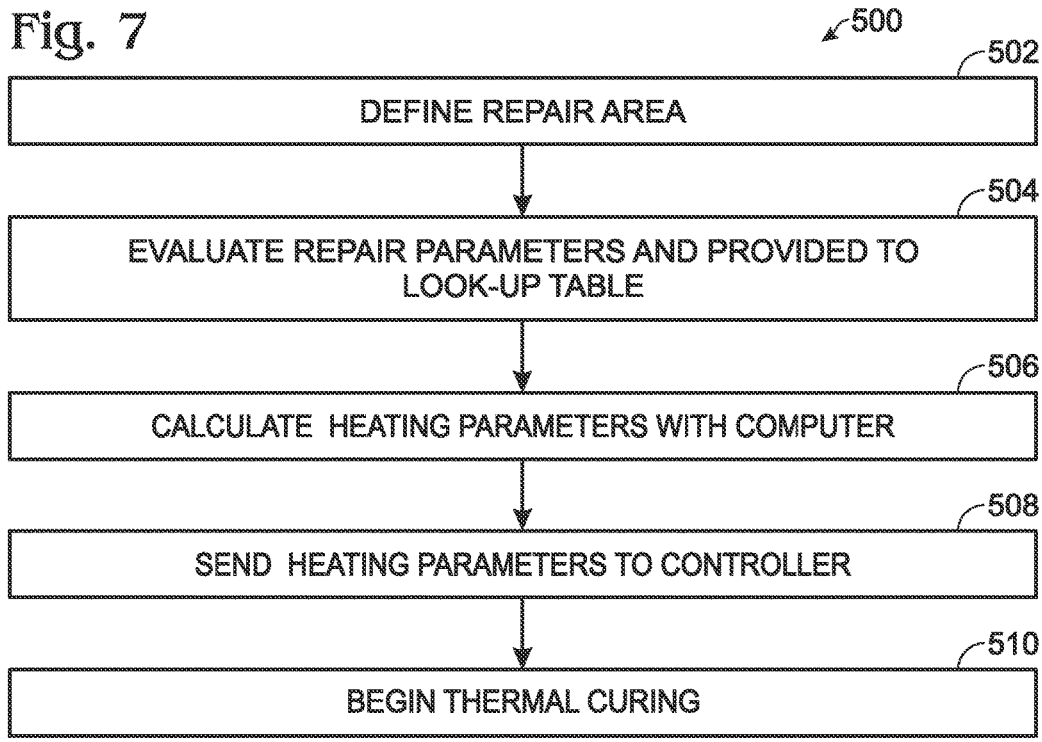
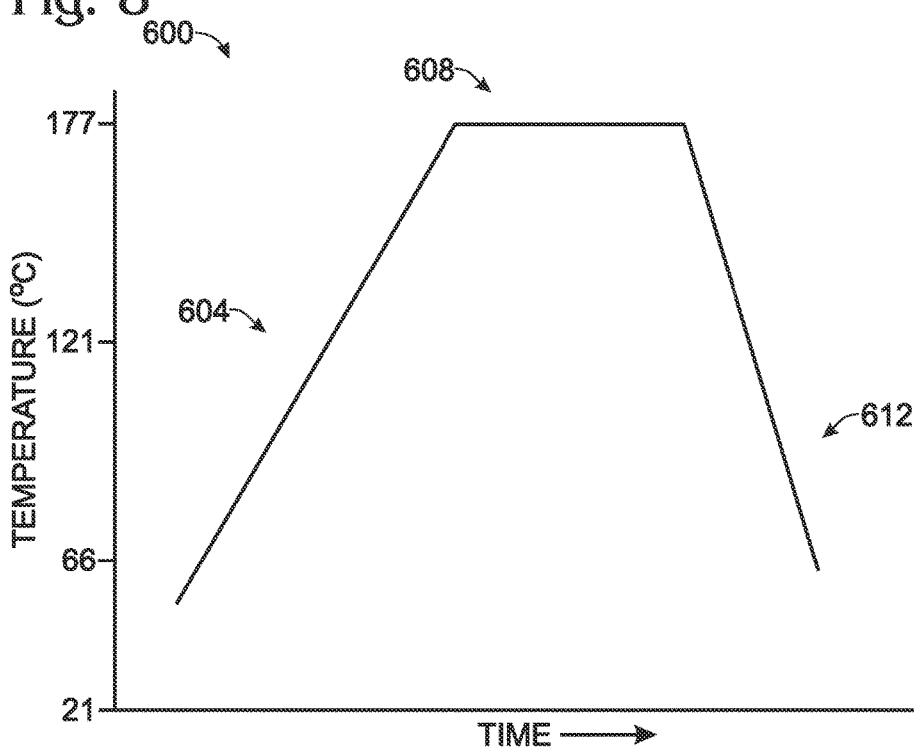

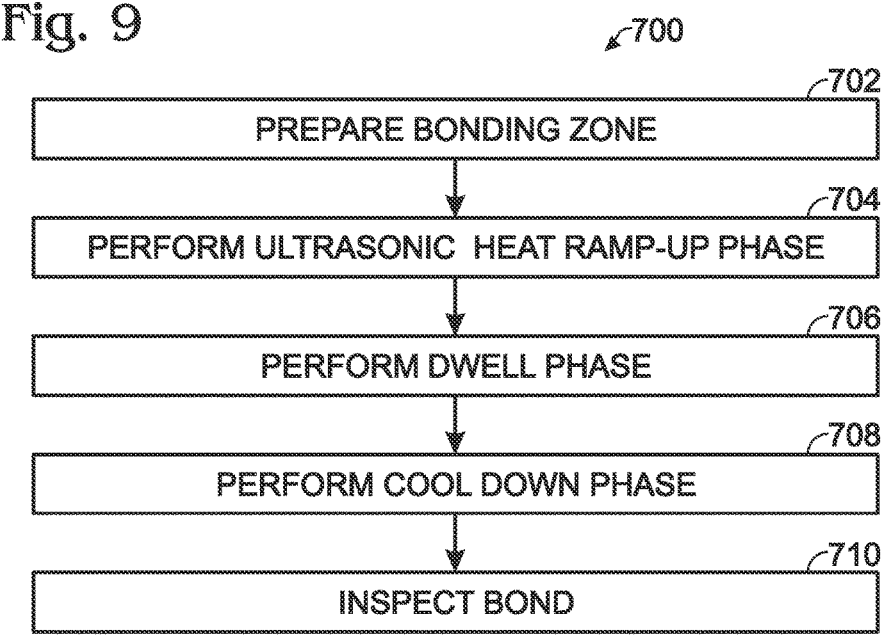
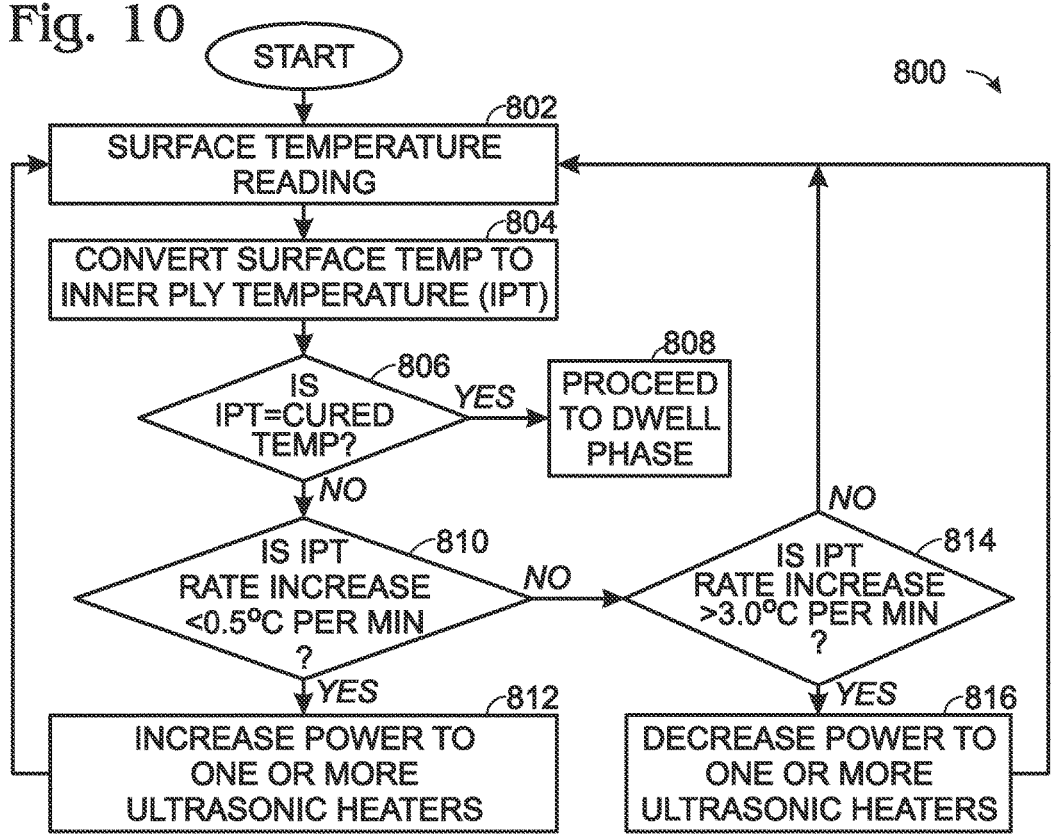

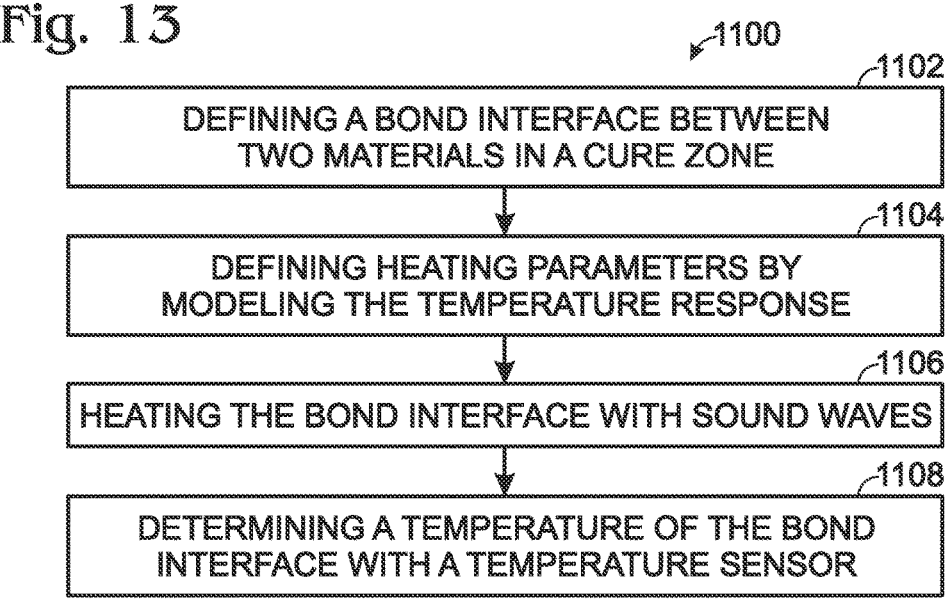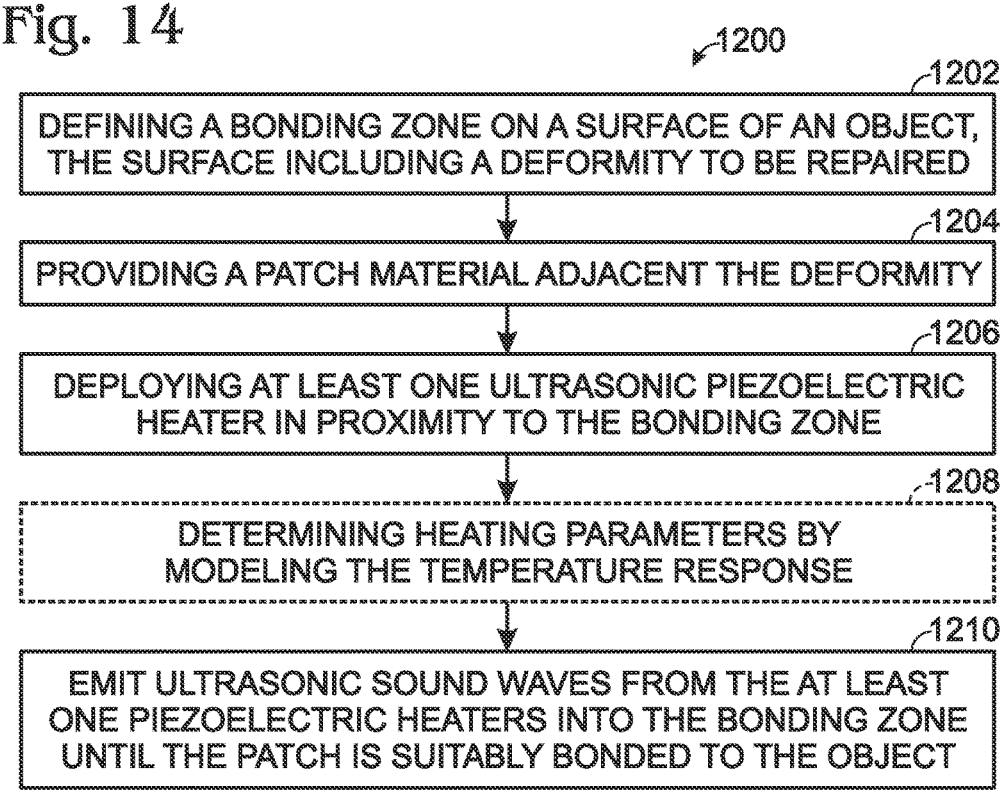

METHODS AND APPARATUS FOR REPAIRING COMPOSITE MATERIALS

FIELD

This disclosure relates to composite materials, and more specifically to apparatuses and methods for heating a bond portion of a composite material.

BACKGROUND

Composite materials are typically made from two or more constituent materials with significantly different physical or chemical properties. Typically, the constituent materials include a matrix (or bond) material, such as resin (e.g., thermoset epoxy), and a reinforcement material, such as a plurality of fibers (e.g., a woven layer of carbon fibers). When combined, the constituent materials typically produce a composite material with characteristics different from the individual constituent materials even though the constituent materials generally remain separate and distinct within the finished structure of the composite material. Carbon-fiber-reinforced polymer is an example of such a composite material.

Composite materials may be preferred for many reasons. For example, composite materials may be stronger and/or lighter than traditional materials. As a result, composite materials are generally used to construct various objects such as vehicles (e.g., airplanes, automobiles, boats, bicycles, and/or components thereof), and non-vehicle structures (e.g., buildings, bridges, swimming pool panels, shower stalls, bathtubs, storage tanks, and/or components thereof).

Occasionally, these composite materials may become damaged, in which case it may be preferable to repair the damaged composite material rather than replace it entirely. Currently, composite repairs are performed with heat blankets that locally (or in-situ) cure matrix material onto the existing damaged composite. However, there are various problems associated with using heat blankets, such as uneven heating, misplaced heating, slow heating speeds, long cure times, thermal runaways, and/or a lack of adequate temperature control.

SUMMARY

A method of bonding materials may comprise defining a bond interface between two materials in a cure zone on a surface of an object and heating the bond interface with sound waves.

Another method of bonding materials may include defining a bonding zone on a surface of an object. The surface may include a deformity to be repaired. A patch material may be provided adjacent the deformity. At least one ultrasonic piezoelectric heater may be deployed in proximity to the bonding zone. The at least one ultrasonic piezoelectric heaters may emit ultrasonic sound waves into the bonding zone until the patch is suitably bonded to the object.

An apparatus for bonding materials may include at least one piezoelectric heater configured to emit ultrasonic sound waves for bonding composite materials together in a defined cured zone. The apparatus may include a support structure configured to direct the waves toward the cure zone and a temperature sensor for monitoring temperatures of composite materials in the cure zone. The apparatus may include a controller configured to modulate properties of the heater based on temperature received from the sensor.

The present disclosure provides various apparatuses, and methods of use thereof. In some embodiments, an apparatus may include a heating device and a translation assembly. In some embodiments, the heating device may be an ultrasonic heating device, such as one or more piezoelectric heaters. In some embodiments the translation assembly may comprise a flex-track system capable of moving the heating device in at least one dimension substantially parallel to a surface and a direction substantially perpendicular to the surface. The features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 4C is a schematic illustration of the apparatus of FIG. 3C in a reconfigured state, and a second apparatus similar to the apparatus of FIG. 3C, with the apparatuses adjacent to the prepared damaged surface of FIG. 4B to heat respective bond interfaces between the patches and the prepared damaged surface.

FIG. 5 is a schematic illustration of two of the apparatuses of FIG. 3C reconfigured to function as a phased array of heaters.

FIG. 7 is a flowchart illustrating a method for determining repair parameters.

FIG. 8 is a chart of an illustrative bond cure cycle.

FIG. 9 is a flowchart illustrating a method for bonding materials, including an ultrasonic heat ramp-up phase, a dwell phase, and a cool down phase.

FIG. 10 is an illustration of operations performed by one embodiment of a feedback loop for the ultrasonic heat ramp-up phase.

FIG. 13 is a flowchart illustrating another method for bonding materials.

FIG. 14 is a flowchart illustrating yet another method for bonding materials.

DESCRIPTION

Overview

Various embodiments of apparatuses and methods for bonding materials are described below and illustrated in the associated drawings. Unless otherwise specified, an apparatus or method and/or their various components or steps may, but are not required to, contain at least one of the structures, components, functionality, and/or variations described, illustrated, and/or incorporated herein. Furthermore, the structures, components, functionalities, and/or variations described, illustrated, and/or incorporated herein in connection with the apparatuses and methods may, but are not required to, be included in other similar apparatuses or methods. The following description of various embodiments is merely exemplary in nature and is in no way intended to limit the disclosure, its application or uses. Additionally, the advantages provided by the embodiments, as described below, are illustrative in nature and not all embodiments provide the same advantages or the same degree of advantages.

SPECIFIC EXAMPLES, MAJOR COMPONENTS, AND ALTERNATIVES

Example 1

This example describes an illustrative apparatus for bonding materials to an object; See FIG. 1.

Figure 1:
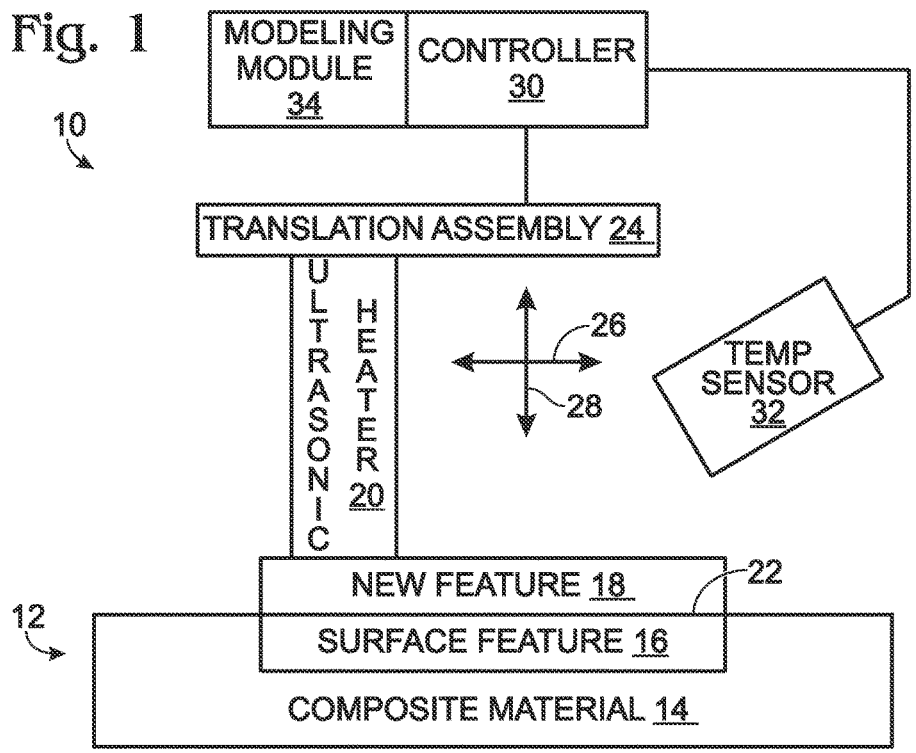
FIG. 1 is a block diagram of an illustrative apparatus and an illustrative object.

FIG. 1 is a schematic diagram of an apparatus, generally indicated at 10, and an object, generally indicated at 12. Object 12 may include a component made of a composite material 14. Composite material 14 may have a surface feature 16. Apparatus 10 may be couples to composite material 14 to bond a new feature 18 to surface feature 16. In some embodiments, surface feature 16 may be a fault in composite material 14, in which case, new feature 18 may be a repair patch, and surface feature 16 may be prepared and/or altered before new feature 18 is bonded to composite material 14.

Apparatus 10 may include an ultrasonic heater 20. For example, ultrasonic heater 20 may include one or more piezoelectric heaters. Ultrasonic heater 20 may be configured to emit ultrasonic sound waves to heat a bond interface 22 between new feature 18 and surface feature 16. Bond interface 22 may include a bond portion of a composite, such as a layer of thermo-curable (or thermo-setting) matrix material. Device 20 may suitably heat the bond portion to cure the bond portion, and thus bond new feature 18 to pre-existing composite material 14.

Apparatus 10 may include a translation assembly 24. Translation assembly 24 may be capable of moving the ultrasonic heater 20 so that the ultrasonic heater maintains physical contact with the new feature 18, the surface feature 16, or the composite material 14. Translation assembly 24 may be capable of moving the ultrasonic heater in one or more directions 26 that are substantially parallel to the surface of composite material 14, with the ultrasonic heater 20 maintaining physical contact with the surface as the ultrasonic heater moves. Translation assembly 24 may be capable of moving the ultrasonic heater 20 in a direction 28 that is substantially perpendicular to the surface of the composite material 14. Translation assembly 24 may be capable of moving the ultrasonic heater from a position where the ultrasonic heater is not in contact with new feature 18, surface feature 16 or composite material 14 to a position where the ultrasonic heater is in contact with one of the new feature 18, surface feature 16, or composite material 14. Translation assembly 24 may be able to increase or decrease a contact force with which the ultrasonic heater is making contact with one of the new feature 18, surface feature 16, or composite material 14 while the ultrasonic heater maintains contact with one of the new feature 18, surface feature 16, or composite material 14. The translation assembly may operatively couple apparatus 10 to object 12. Translation assembly 24 may releasably couple apparatus 10 to object 12. Translation assembly 24 may move the ultrasonic heater relative to the object or it may hold the ultrasonic heater stationary relative to the object. Translation assembly 24 may alternate or switch between moving the ultrasonic heater and holding it stationary.

Apparatus 10 may include a controller 30, a temperature sensor 32, and a modeling module 34. Controller 30 may communicate with the ultrasonic heater 20, the translation assembly 24, the temperature sensor 32, and the modeling module 34. The ultrasonic heater may change any of a number of heating parameters in response to communication from controller 30. Such heating parameters include, but are not limited to, a frequency of sound waves being emitted by the ultrasonic heater, an amplitude of sound waves being emitted by the ultrasonic heater, a phase of sound waves being emitted by the ultrasonic heater, a direction of sound waves being emitted by the ultrasonic heater, and, in the case of the ultrasonic heater including more than one heating element, a phase difference between sound waves emitted by one or more of the heating elements. Translation assembly 24 may move the ultrasonic heater 20 in one or more directions or change the contact force the ultrasonic heater is making with a material in response to communication from controller 30.

Temperature sensor 32 may be configured to measure a temperature of one or more locations proximate new feature 18, surface feature 16, or composite material 14. For example, temperature sensor 32 may include a thermocouple or infrared detector configured to measure an exposed surface temperature. Controller 30 may alter one or more heating parameters in response to the temperature measurements made by sensor 32.

Modeling module 34 may be configured to mathematically model the temperature response of one or more of the new feature 18, the surface feature 16, the bond interface 22, and the composite material 14 proximate the surface feature when any of these are exposed to the heat generated by ultrasonic heater 20. Modeling module 30 make take as inputs, for example, one or more of the following: the materials from which the new feature, the surface feature, or the composite material are constructed, the physical and thermal properties of any of the relevant materials, temperature measurements from the temperature sensor 32, the stage of the cure cycle currently being performed (e.g., see FIG. 8), information provided by a visible camera, information provided by a user of apparatus 10, any boundary conditions for the relevant materials, the current heating parameters of ultrasonic heater 20, the range of possible heating parameters available to ultrasonic heater 20, the current location of ultrasonic heater 20, and others. Modeling module 34 may conduct this modeling before any heat has been applied to the new feature 18 or the composite material 14. Alternatively, modeling module 34 may conduct this modeling at substantially the same time as any heat is applied to the new feature or the composite material. Controller 30 may change one or more of the heating parameters of the ultrasonic heater 20 in response to the calculations made by the modeling module 34. Controller 30 may direct translation assembly 24 to alter the position and/or contact force applied by the ultrasonic heater in response to calculations made by the modeling module 34.

Example 2

This example describes another illustrative apparatus for bonding materials to an object; see FIGS. 2-6.

Figure 2:
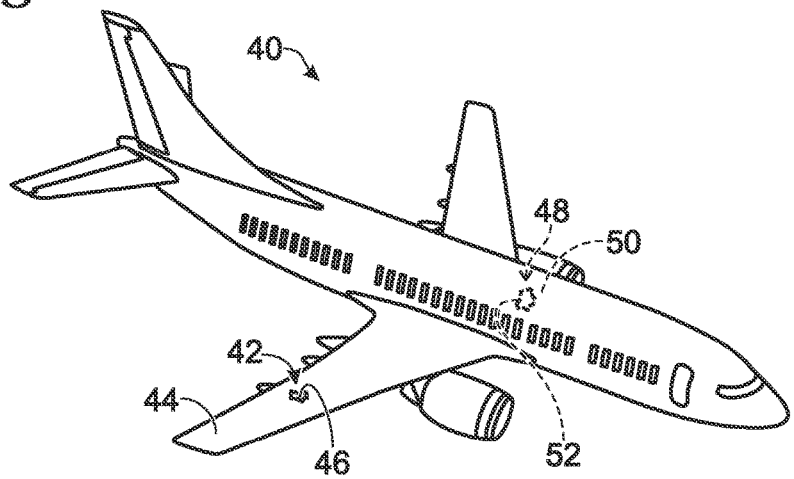
FIG. 2 is an illustration of an airplane having a damaged external surface and a damaged internal surface.

FIG. 2 depicts an illustrative object 40. Object 40 may include one or more components, such as fuselage skin, wing skin, a frame, a plurality of floor beams, and/or a plurality of horizontal stabilizers. The one or more components may be made of one or more composite materials, such as a laminate material, a honeycomb material, and/or one or more of the various exemplary composite materials described in U.S. Pat. Nos. 8,490,348 and 8,642,168, which are hereby incorporated by reference. While FIG. 2 shows object 40 to be an airplane, the object may be any other suitable structure, such as an automobile or a building.

In some cases, it may be desirable to define a bonding (or cure) zone on a portion of the object. For example, it may be desirable to define the bonding zone in order to add a new surface feature to an existing surface feature of one of the components of object 40. Examples of new surface features may include additional layers of reinforcement, and/or a new flange for mounting yet another feature. In the immediate example, it may be desirable to define a bonding zone 42 on an external surface 44 of object 40 in order to repair an existing surface feature, such as a fault (or deformity, or damaged area) 46. Alternatively or additionally, it may be desirable to define a bonding zone 48 on an internal surface 50 of object 40 to repair a fault 52. Fault 46 and/or fault 52 may be the result of an impact (e.g., from a technician dropping a tool on the surface, or a collision with another object), decompression stress, or fire damage, for example. In some cases, either of faults 46 or 52 may require repair in order for object 40 to be safely operated. In other cases, either of these faults may be a cosmetic fault that does not require repair, but may be a desirable repair nonetheless.

Figure 3A:
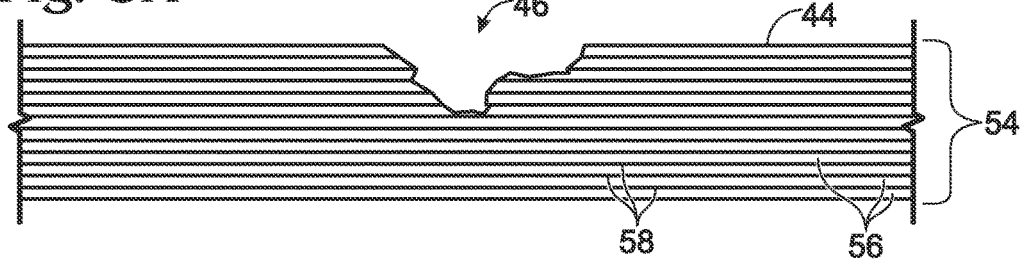
FIG. 3A is a cross-sectional illustration of the external damaged surface of FIG. 2.

FIG. 3A shows a cross-sectional view of fault 46 in surface 44 of the composite material, which is indicated here at 54. Material 54 may be a laminate including existing matrix material 56, such as a thermo-set adhesive or epoxy that has already been cured, and existing reinforcement material 58, such as a plurality of woven carbon fiber layers. In FIG. 3A, fault 46 is shown as an indentation (or breach) in surface 44 that extends through multiple layers of reinforcement material 58. In other examples, the fault may extend through a lesser or greater portion of material 54. For example, the fault may be a scratch in surface 44, or may be a hole extending all the way through the material (e.g., as in FIG. 4A).

Figure 3B:
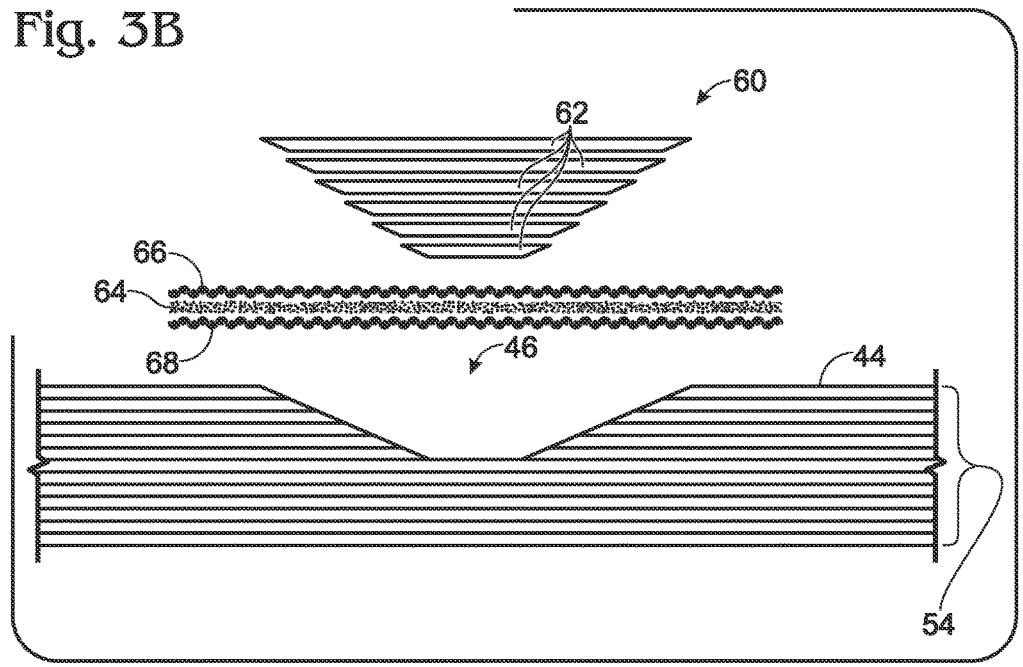
FIG. 3B is a cross-sectional illustration of the external damaged surface prepared for repair with a patch.

Preparing fault 46 for repair may involve removing a portion of composite material 54 (e.g., by sanding and/or grinding material 54 proximate fault 46). For example, preparing fault 46 may involve tapering the damaged area, as is shown in FIG. 3B. Preferably, edge portions of fault 46 may be tapered with a taper ratio of about 30:1 (e.g., so that an orientation of the edge may deviate from an orientation of surface 44 by only about 1.5 degrees). Fault 46 may then be cleaned with an approved solvent.

A patch (or patch material) 60 may be created by bonding together multiple repair plies 62 of composite material. Plies 62 may include alternating layers of matrix and reinforcement material, or any other suitable combination of materials.

Figure 3C:
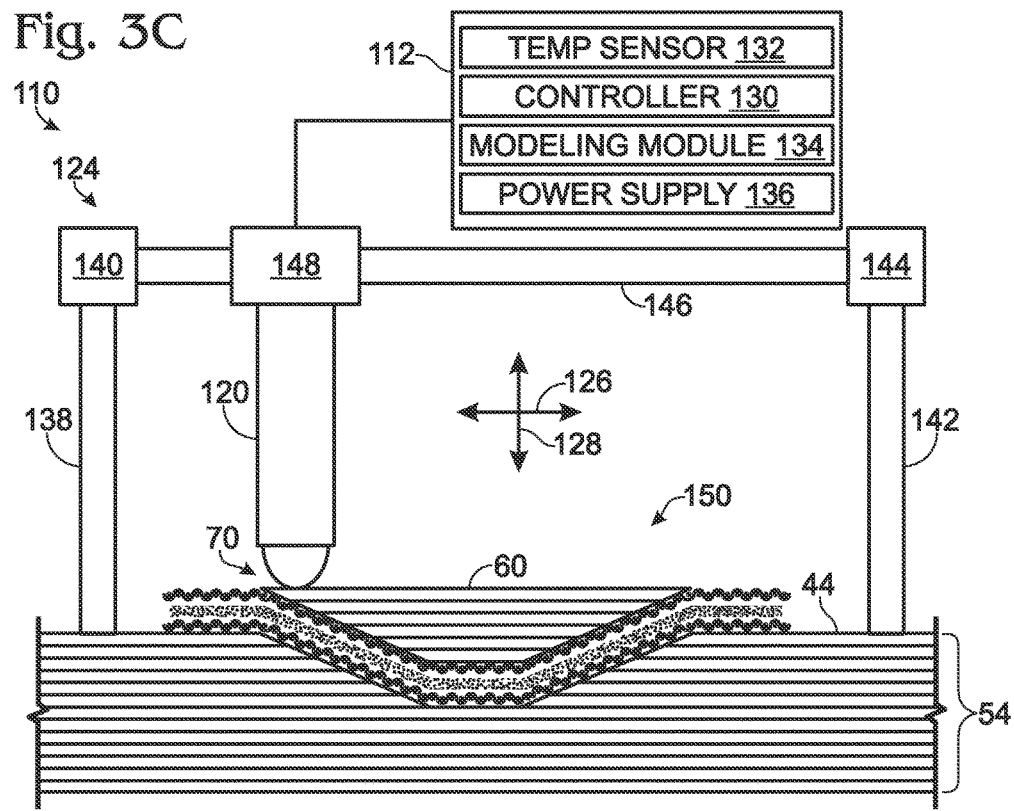
FIG. 3C is a schematic illustration of an apparatus including a heater adjacent to the external damaged surface to heat a bond interface between the patch and the external damaged surface.

Patch 60 may be positioned adjacent fault 46. For example, a layer of adhesive film 64 may be disposed between first and second layers 66, 68 of positioning fabric. Film 64 may be a matrix material, such as a thermo-setting adhesive. Layers 66, 68 may be sheets of reinforcement material, for example, prepreg, which may have interstitial spaces or voids between fabric fibers through which adhesive film 64 may permeate. In one exemplary embodiment, layers 66, 68 comprise a reinforcement material, such as Kevlar® prepreg having porosity of at least 0.2%, 2.0%, 5.0%, 7.0% or 10.0% through which adhesive film 64 may permeate. Film 64 and layers 66, 68 may be positioned in fault 46, such that layer 68 contacts fault 46. Patch 60 may then be positioned in fault 46 (e.g., such that patch 60 contacts layer 66) to define a bond interface 70 between patch 60 and composite material 54, as shown in FIG. 3C. Film 64 may permeate layer 66 to contact patch 60, and may permeate layer 68 to contact composite material 54.

At apparatus, generally indicated at 110 in FIG. 3C, may be used to heat bond interface 70. Apparatus 110 may heat bond interface 70 by directing ultrasonic sound waves to bond interface 70 and other materials proximate bond interface 70.

Figure 3D:
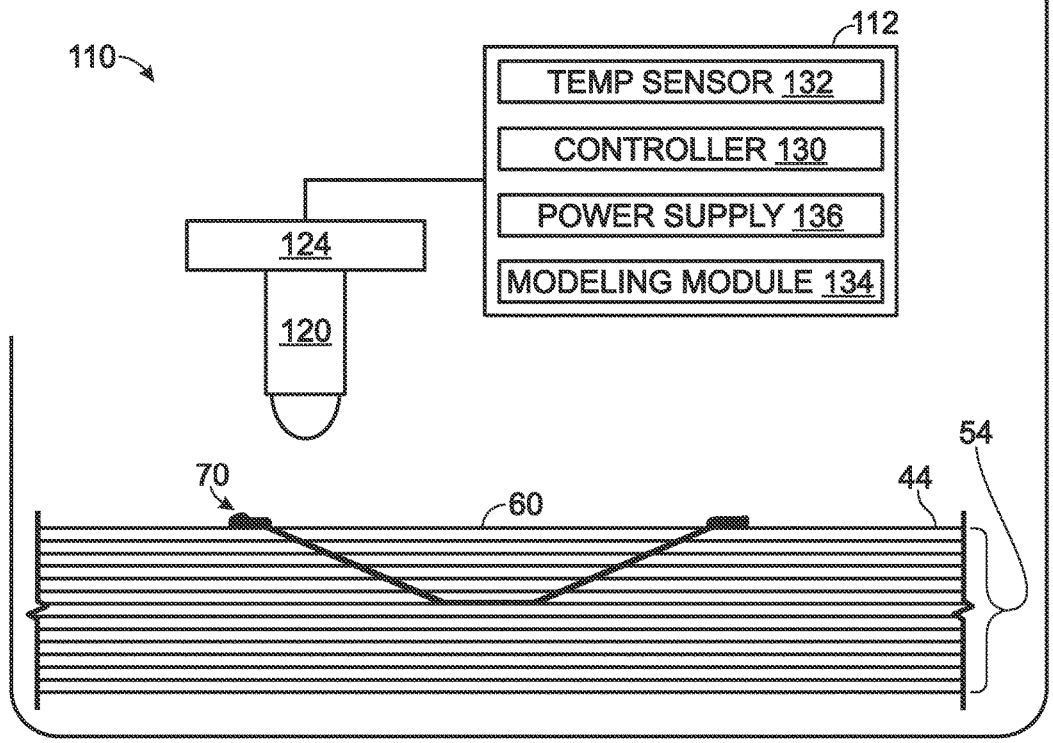
FIG. 3D is a schematic illustration similar to FIG. 3C, but showing the bond interface in a cured state.

Apparatus 110 may include circuitry 112, an ultrasonic heater 120, and a support structure 123. The support structure 123 may include a translation assembly 124 capable of moving the ultrasonic heater in one or more directions 126 substantially parallel to surface 44 and a direction 128 substantially perpendicular to surface 44. Circuity 112 may include a controller 130, a temperature sensor 132, a modeling module 134, and a power supply 136. Ultrasonic heater 120 may direct ultrasonic sound waves toward bonding zone 42 to heat bond interface 70. Controller 130 may be used to control a set of heating parameters of ultrasonic heater 120. Translation assembly 124 may move ultrasonic heater 120 in up to three spatial dimensions in response to communication with controller 130. Apparatus 110 may apply ultrasonic sound waves to bonding zone 42 until patch 60 is suitably bonded to composite material 54 of the object as shown in FIG. 3D.

Support structure 123 may include any suitable means for holding ultrasonic heater 120 in proximity to the surface of patch 60 or composite material 54 so that the sound waves emitted by ultrasonic heater 120 are directed toward the bonding interface. Translation assembly 124 may include any suitable means for moving ultrasonic heater 120 around the surface of patch 60 or composite material 54. In the exemplary embodiment shown in FIG. 3C translation assembly 124 includes a first set of towers 138 which may support a first track 140. The first track and the first set of towers may extend in a direction substantially perpendicular to directions 126 and 128 indicated in FIG. 3C, that is, in a direction substantially perpendicular to the plane of FIG. 3C. Translation assembly 124 may include a second set of towers 142 which may support a second track 144. Second track 144 and the second set of towers 142 may extend in a direction substantially perpendicular to directions 126 and 128 indicated in FIG. 3C. The first and second tracks 140 and 144 may be flexible to accommodate surfaces 44 that are not entirely flat planes but which may have a degree of curvature. Translation assembly 124 may include a crossbar 146 which may be supported by first and second tracks 140 and 144. Crossbar 146 may be able to move in a direction substantially perpendicular to directions 126 and 128, that is, along the length of tracks 140 and 144. Translation assembly 124 may include a translation subassembly 148 capable of moving along crossbar 146 direction 126. Translation subassembly 148 may be attached to ultrasonic heater 120 so that when the translation subassembly moves in direction 126 ultrasonic heater 120 also moves in direction 126. If ultrasonic heater 120 is moveable back and forth in direction 126 along crossbar 146 and crossbar 146 is moveable back and forth in a direction substantially perpendicular to direction 126 and also parallel to surface 44, then the ultrasonic heater 120 may be moveable in two dimensions substantially parallel to the surface of composite material 54. If a repair area 150 is defined by patch 60 and the surface 44 of composite material 54 proximate patch 60, ultrasonic heater 120 may be moved by translations means 124 to any location in the repair area 150. Translation subassembly 148 may include an actuator 152 capable of moving ultrasonic heater 120 in a direction 128 substantially perpendicular to surface 44. Actuator 152 may allow ultrasonic heater 120 to maintain contact with an uneven surface 44 as the heater moves along crossbar 146, or as crossbar 146 moves along the first and second tracks 140 and 144. As the ultrasonic heater makes contact with the repair area the contact forces applied by the heater to the repair area may be adjusted by actuator 152. Actuator 152 may move ultrasonic heater 120 from a position where the ultrasonic heater makes contact with the repair area 150 to a position where the ultrasonic heater is not in contact with the repair area. Crossbar 146 and translation subassembly 148 may move, and actuator 152 may activate in response to communication from controller 130. It should be understood that there are many possible support structures and translation assemblies capable of supporting the heater in proximity to the object and moving the heater in three dimensions near the surface of the object.

Ultrasonic heater 120 may include one or more piezoelectric heating elements. One or more of the piezoelectric heating elements may include a single piezoelectric crystal capable of converting an oscillating electrical potential difference into a mechanical oscillation. Alternately, one or more the piezoelectric heating elements may include a stacked piezoelectric crystal. The individual crystals may be as small as 2.5 mm or as large as 50 mm. Larger piezoelectric crystals or stacks of crystals may need to be driven at larger potential differences. The heating parameters may be determined by the contemplated repair. That is, the required power and frequency of the sound waves emitted by the piezoelectric heating elements may be determined by factors associated with the repair, for example, the size of the repair, the depth of the repair, the materials involved in the repair, and the boundary conditions of the materials involved. The specific piezoelectric heating element used may be tailored to a particular repair or a particular kind of repair. For example, a composite material may have a natural vibration frequency in that the material may experience relatively large amplitude vibrations when driven by sound waves at that natural vibration frequency. Driving the material at its natural vibration frequency may increase the temperature of the material more efficiently than if the material were driven by sound waves at another frequency. The specific natural vibration frequencies of various materials may depend on the materials themselves, the physical situation in which the materials are situated, and properties of the sound waves applied to the material.

Circuitry 112 may include, at least one temperature sensor 132, a controller (or power controller) 130, a modeling module 134, and a power supply 136. Sensor 132 may be configured to measure a temperature of one or more locations inside bonding zone 42. For example, sensor 132 may include a thermocouple or infrared detector configured to measure an exposed surface temperature of patch 60, an exposed surface temperature of bond interface 70, and/or an exposed surface of surface 44 inside the closed chamber. Measurements from sensor 132 may be used to tailor (and/or monitor) the amount of sound waves applied to bond interface 70, and in some embodiments may be used to avoid thermal runaways. Controller 130 may be configured for selectively powering the ultrasonic heater 120. For example, controller 130 may be configured to modulate power provided to ultrasonic heater from power supply 136 based on the temperature measurements from sensor 132 to modulate a heating rate of bond interface 70. Modulating the power provided to heater 120 may include modulating a duty cycle of the heater (e.g., modulating a frequency at which the heater 120 is turned off and on to modulate the heating rate), modulating an emission frequency of sound waves 154 (e.g., modulating a frequency 170 of the sound waves 154 to modulate the heating rate), and/or modulating an amplitude 172 of the sound waves 154 (e.g., modulating the amplitude of sound waves 154 to modulate the heating rate). Controller may direct the translation assembly 124 to move ultrasonic heater 120 to a different location based on the temperature measurements from sensor 132.

Figure 11:
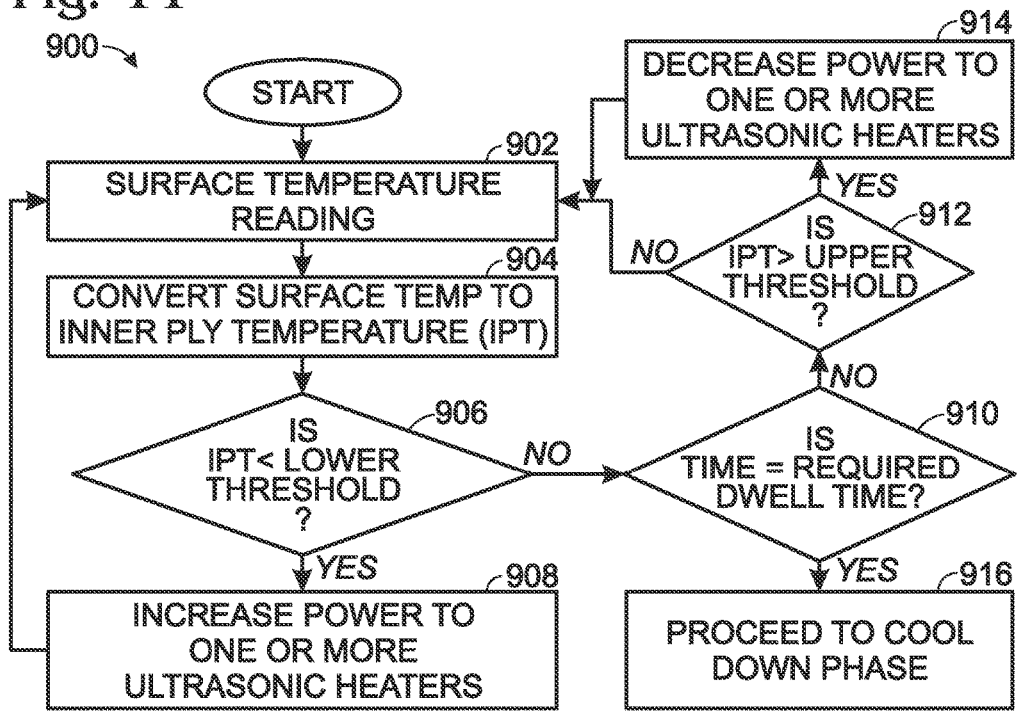
FIG. 11 is an illustration of operations performed by one embodiment of a feedback loop for the dwell phase.
Figure 12:
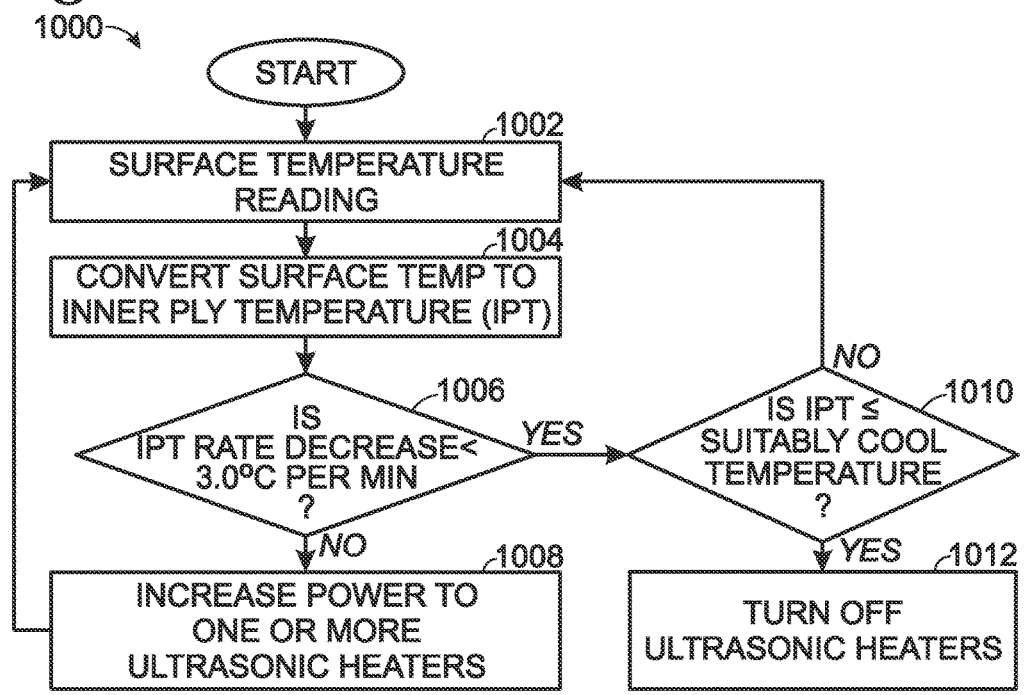
FIG. 12 is an illustration of operations performed by one embodiment of a feedback loop for the cool down phase.
Figure 15:
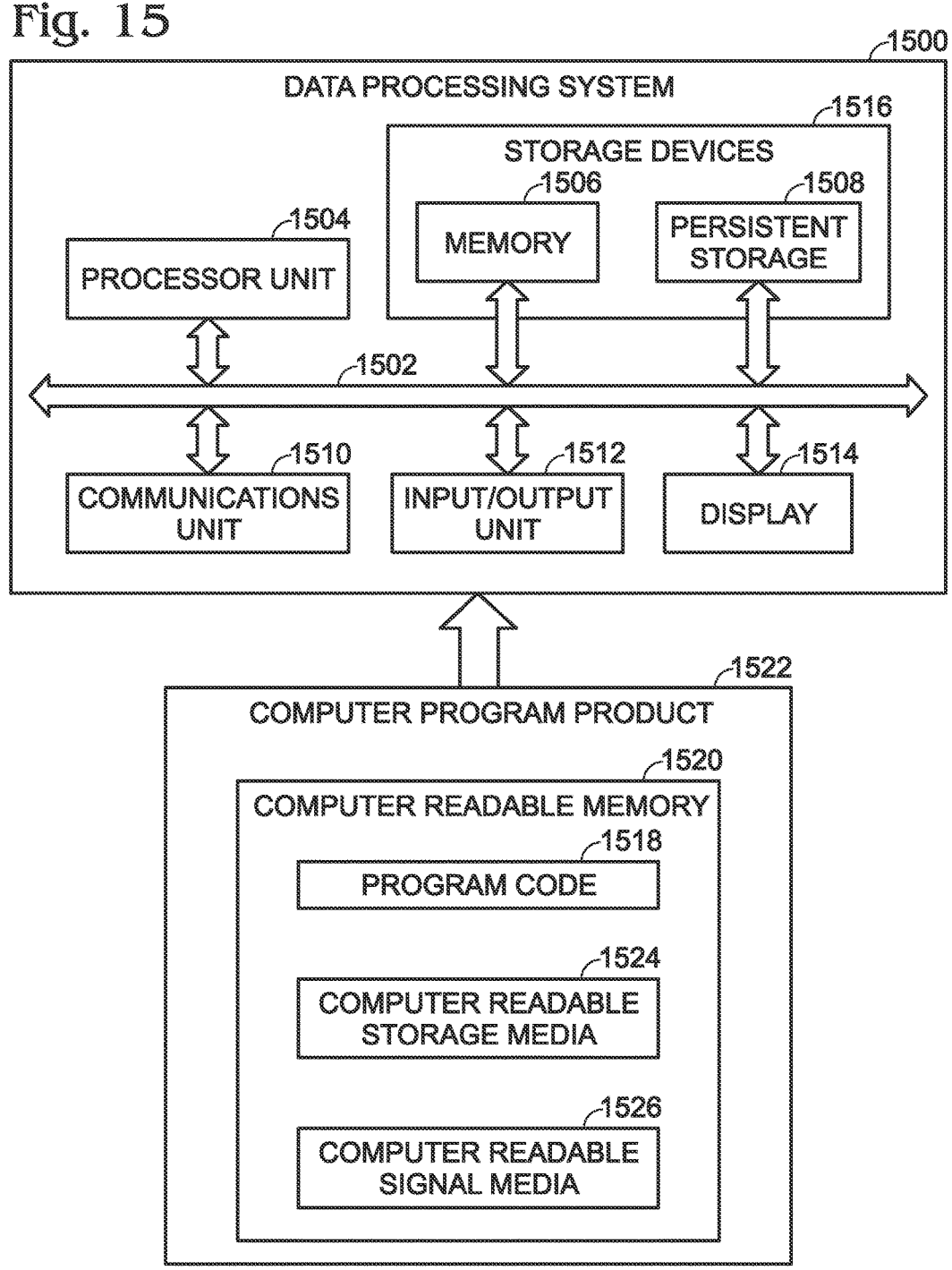
FIG. 15 is a schematic diagram of an illustrative data processing system.

Circuitry 112 may include a data processing system (e.g., as depicted in FIG. 15) which may implement one or more feedback loops (e.g., as depicted in FIGS. 10-12) to modulate and/or monitor the heating rate at which bond interface 70 is heated. In some embodiments, controller 130 may be programmed to implement the one or more feedback loops.

Piezoelectric heating elements convert electrical signals into mechanical vibrations via the piezoelectric effect. This effect may also work in the other direction, that is, many piezoelectric heating elements can also convert mechanical vibrations into electrical signals. Thus, a single piezoelectric heating element may be able to both function as an emitter and send sound waves into an object and function as a detector and register sound waves that have travelled through the material. This basic principle is used in the medical field with ultrasonic imaging devices. Such devices may have piezoelectric elements dedicated to sending out sound waves and other piezoelectric elements dedicated to receiving reflected sound waves or, as described above, may use piezoelectric elements for sending and receiving sound waves via a pulse-echo technique. Ultrasonic heater 120 may be used in such a manner to inspect the object or the repair area by sending and receiving pulses of sound waves and then analyzing the received pulses with the data processing system of circuitry 112.

In some embodiments, apparatus 110 may be computer controlled. For example, the data processing system of circuitry 112 may be configured to allow a user to define a heating program. The heating program may include computer readable instructions corresponding to specific temperatures, for specific times, and/or for specific subzones within bonding zone 42 in order to accurately heat bond interface 70. The heating program may be defined based on a thermal survey of the object in the vicinity of bonding zone 42. In some embodiments, the data processing system may be configured to allow the user to select a heating program from a plurality of pre-defined (or predetermined, or pre-programmed) heating programs, rather than manually define the heating program. In some embodiments, the data processing system may be configured to allow the user to input a geometric dataset, such as a digital computer aided drafting (CAD) model. The geometric dataset may correspond to a portion of the object in the vicinity of bonding zone 42. Based on the geometric dataset, the data processing system may determine, select, and/or recommend a matching or optimum heating program. In some embodiments, the data processing system of circuitry 112 may include a modeling module 134. Modeling module 134 may be configured to mathematically model the temperature response of the bonding zone, the bond interface, the repair zone, patch 60, composite material 54, and/or others. The heating program may be defined in part by the calculations made by modeling module 134. The heating program may be determined before heating begins and it may also be updated or modified during the heating process. Modeling module 134 may determine the necessary power, frequency, and other parameters of the sound waves that will heat the bond interface and may thus influence a choice of piezoelectric heating elements.

FIG. 3D shows bond interface 70 after it has been suitably heated, which may correspond to a cured state of bond interface 70, such that patch 60 is sufficiently bonded to composite material 54.

Circuitry 112 may be configured to determine when bond interface 70 has been suitably heated. In response to a suitably heated determination, circuitry 112 may power down heater 120. Circuitry 112 may be configured to indicate the suitably heated determination to the user. Circuitry 112 may be configured to indicate to the user that the emitters have been powered down and are no longer emitting sound waves. In response to either one of these indications, the user may remove (and/or uncouple) apparatus 110 from surface 44, and inspect the repair. In some embodiments, the user may sand or otherwise remove any undesirable artifacts (e.g., any bumps adjacent patch 60 that are not flush with surface 44).

Figure 4A:
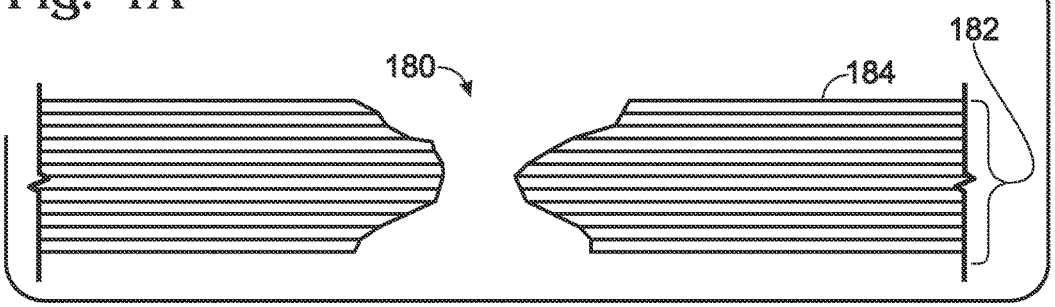
FIG. 4A is a cross-sectional illustration of another damaged surface.

After apparatus 110 is removed from surface 44, apparatus 110 may be used (and/or reconfigured) to repair another damaged area in a location remote from bonding zone 42, such as a surface feature 180 (see FIG. 4A), which may be any composite surface feature (or surface feature made of a composite material) anywhere on or in object 40, or other object, such as an automobile, boat, or building. Feature 180 is shown in FIG. 4A to be a fault. However, in other examples, the surface feature may not be a fault, but rather a location on (or in) the object to which it is desirable to heat (and/or cure) a composite bond interface to add a new article of manufacture.

As shown in FIG. 4A, feature 180 may be a hole that extends through a wall formed by a composite material 182 having a surface 184. Similar to material 54, material 182 may include one or more layers of reinforcement material laminated in matrix material.

Figure 4B:
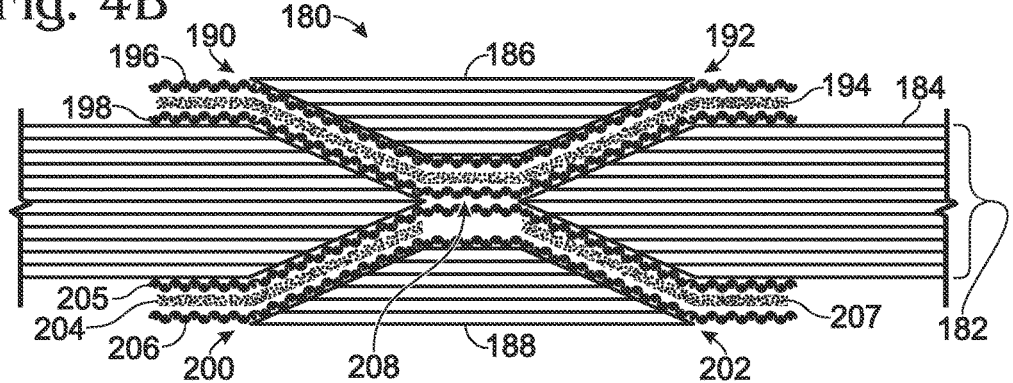
FIG. 4B is a cross-sectional illustration of the damaged surface of FIG. 4A prepared for repair with a pair of opposing patches.

As shown in FIG. 4B, edges of feature 180 may be prepared in a manner similar to fault 46 (see FIG. 3B). Patches 186, 188 may be created (and/or prepared) in a manner similar to patch 60 to repair feature 180. Patch 186 may be placed in feature 180 to define bond interfaces 190, 192 between patch 186 and material 182. For example, patch 186 may be placed in feature 180 with an adhesive film 194 and positioning fabric layers 196, 198 between patch 186 and material 182. Similarly, patch 188 may be placed in feature 180 to define bond interfaces 200, 202 between patch 188 and material 182. For example, an adhesive film 204 and positioning fabric layers 205, 206 may be sandwiched between patch 188 and material 182 to define bond interface 200, and an adhesive film 207 and positioning fabric layers 205, 206 may be sandwiched between patch 188 and material 182 to define bond interface 202. A bond interface 208 may be defined by positioning fabric layers 196, 198, 205, 206 and adhesive film 190 sandwiched between patches 186, 188. When sandwiched together adhesive films 194, 204, 207 may permeate through layers 196, 198, 205, and/or 206 to create a sufficient bond interface. Fabric layers 196, 198, 205 and 206 may have interstitial spaces or voids between internal fabric fibers through which adhesive film 204 and 207, and in one exemplary embodiment, layers 196, 198, 205 and 206 comprise a fabric material having porosity of at least 0.2%, 2.0%, 5.0%, 7.0% or 10.0% through which adhesive film 204 and 207 may permeate.

In FIG. 4C, apparatus 110 and an apparatus 210 are coupled to opposite sides of material 182 to define a bonding zone, which is shown here as including subzones 254*a*, 254*b*. Apparatuses 110, 210 may be coupled to material 182 with any suitable structure, mechanism, or device. For example, one or more fasteners such as one or more straps, adhesives, magnets, clamps, or other suitable structure may be used to couple either one of the apparatuses to material 182.

Apparatus 210 may be similar to apparatus 110 in structure and function. For example, apparatus 210 may include circuitry 212, an ultrasonic heater 220, and a translation assembly 224. Circuitry 212 may be similar to circuitry 112. Ultrasonic heater 220 may be similar to ultrasonic heater 120. Translation assembly 224 may be similar to translation assembly 124. Circuitry 212 may include a controller 230 (e.g., which may be similar to controller 130) at least one temperature sensor 232 (e.g., which may be similar to sensor 132), a modeling module 234 (e.g., which may be similar to modeling module 134), and a power supply 236 (e.g., which may be similar to power supply 136).

Apparatuses 110, 210 may be operated to heat bond interfaces 190, 192, 200, 202, 208 using sound waves. For example, heaters 120, 220 may emit ultrasonic sound waves to bonding zones 254*a*, 254*b* until patches 186, 188 are suitably bonded to material 182. In some embodiments, circuitry 212 and circuitry 112 may be in communication with one another, which may improve feedback control of the apparatuses.

FIG. 5 shows an alternate set-up for repairing material 54. In FIG. 5, material 54 may be prepared and a patch 60 may be applied in a similar manner to FIGS. 3B and 3C. An apparatus 310 may include circuitry 312, more than one ultrasonic heater 320 and 320', and a translation assembly 324 capable of moving the ultrasonic heaters in at least one direction 126 substantially parallel to surface 44 and a direction 128 substantially perpendicular to surface 44. Ultrasonic heaters 320 and 320' may be similar to ultrasonic heater 120. Translation assembly 324 may be similar to translation assembly 124.

Circuitry 312 may include a controller 330 (e.g., which may be similar to controller 130), at least one temperature sensor 332 (e.g., which may be similar to temperature sensor 132), a modeling module 334 (e.g., which may be similar to modeling module 134), and a power supply 336 (e.g., which may be similar to power supply 136).

FIG. 5 depicts two ultrasonic heaters 320 and 320', but there may be any number of ultrasonic heaters in apparatus 310, including two ultrasonic heaters and more than two ultrasonic heaters. The translation assembly 324 may move the more than one heaters around the repair area 150 as a single unit or it may move the more than one heaters independently. The ultrasonic heaters in apparatus 310 may be operated as a phased array. That is, as each heater emits sound waves 354, one or more of a frequency 370 of the sound waves, an amplitude 372 of the sound waves, and a phase 374 of the sounds waves may be independently determined by controller 130. For example, the phase 374 of the sound waves 354 emitted by heater 320 may be the same as the phase 374' of the sounds waves 354' emitted by heater 320', that is, the sound waves 354 and 354' may be in phase. The sound waves 354 and 354' may be made to have any phase relationship, from completely in phase, to completely out of phase, including any phase difference between in and out of phase. As the sound waves emitted from heaters 320 and 320' move through bonding zone 42 the sound waves may overlap. By the principle of superposition for waves, the sound waves may constructively and destructively interfere with one another. There may be a first location in bonding zone 42 where the sound waves 354 and 354' from ultrasonic heaters 320 and 320' have a phase relationship so that the sound waves constructively interfere, that is where the amplitude of the total sound wave is greater than either of the two amplitudes 372 or 372' individually. The heating at such a first location may be greater than if apparatus 110 with only one ultrasonic heater was being used. Similarly, there may be a second location in bonding zone 42 where the sound waves 354 and 354' from ultrasonic heaters 320 and 320' have a phase relationship so that the sound waves destructively interfere, that is where the amplitude of the total sound wave is less than either of the two amplitudes 372 or 372' individually. The heating at such a second location may be less than if apparatus 110 with only one ultrasonic heater was being used. By controlling the relative phase of the sound waves from the respective heaters the exact positions of the first and second locations can be adjusted and/or selected in order to apply heat or not apply heat to a specific location within the bonding zone as desired. Even if heaters 320 and 320' are stationary, by adjusting the relative phase of the sound waves the first location may be scanned through the bonding zone. The one or more ultrasonic heaters may be arranged in a one-dimensional array, that is, in a line, or in a two-dimensional array.

Ultrasonic heater 320 may optionally include an acoustic lens 376. Acoustic lens 376 may focus the sound wave entering the object so that the sound waves form a tighter beam as they travel through the object. This may allow for finer control over which locations within the repair area are heated and which locations are not heated. An acoustic lens may be included with any of the exemplary ultrasonic heaters described herein.

Apparatus 310 may optionally include a sound absorbing material 378 applied to the surface 44. Sound absorbing material 378 may serve to limit the sound waves entering the object where the sound absorbing material is applied. Sound absorbing material 378 may partially protect components within the object that would respond poorly to being heated by ultrasonic waves. Sound absorbing material 378 may be applied to the surface so that the material completely surrounds the repair area. The extent of the surface covered with sound absorbing material may depends heavily on the components beneath surface 44 and their tolerance to being heated.

Apparatus 310 may optionally include a visible camera 380. Visible camera 380 may be configured to capture at least one image of a portion of the surface 44. The captured image may include the patch and portions of the surface proximate the patch. Visible camera 380 may be connected to circuitry 312. Circuitry 312 may include a data processor, for example see FIG. 15, capable of analyzing the images captured by the visible camera. The visible camera may capture images in response to directions sent from controller 330 or from a user. Visible camera 380 may be optionally included in any of the apparatuses described herein.

Just as apparatus 110 and 210 are depicted in FIG. 4C, two embodiments of apparatus 310 may be used to repair a fault such as feature 180 in FIG. 4B. Further, apparatus 310 may be used in tandem with apparatus 110 to repair a fault.

Figure 6A:
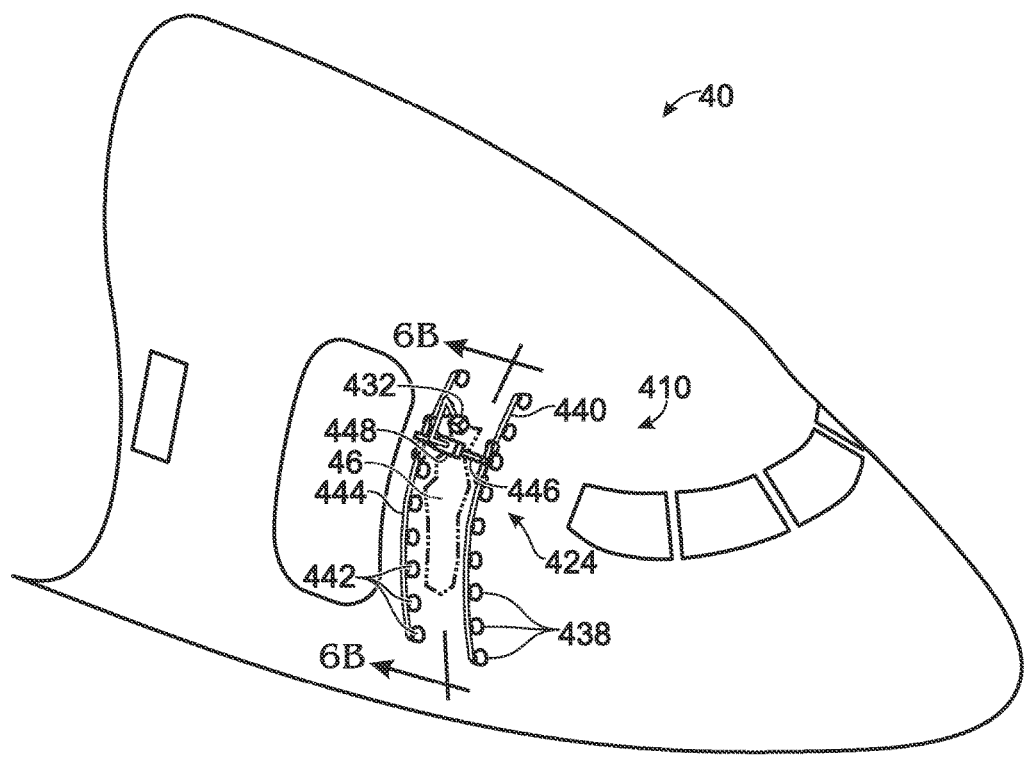
FIG. 6A is a semi-schematic perspective illustration of the apparatus of FIG. 3C showing a temperature sensor and translation assembly for moving the heater in three dimensions.
Figure 6B:
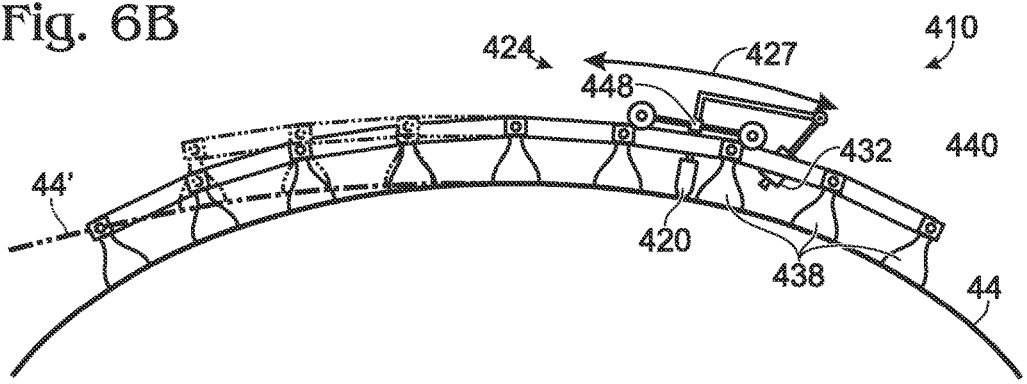
FIG. 6B is a semi-schematic side view illustration, taken at 6B in FIG. 6A, of the apparatus of FIG. 3C showing a translation assembly, an ultrasonic heater, and a temperature sensor.

FIG. 6A is a semi-schematic perspective illustration of an exemplary apparatus 410 attached to object 40 having a fault 46. FIG. 6B is a semi-schematic side view of apparatus 410, taken at 6B in FIG. 6A. Apparatus 410 may include circuity similar to circuitry 112, an ultrasonic heater 420, and a translation assembly 424. The translation assembly may be capable of moving the ultrasonic heater in a first direction, shown at 126 in FIG. 3C, that is substantially parallel to the surface of the object and in a second direction, shown at 427 in FIG. 6B, that is substantially parallel to the surface of the object. Translation assembly 424 may have the capability to move the ultrasonic heater 420 in a direction, shown at 128 in FIG. 3C, that is substantially perpendicular to the surface of the object.

Apparatus 410 may include a temperature sensor 432. Sensor (or sensor unit) 432 may be or include one or more temperature (or heat) sensors. The one or more temperature sensors may be configured to measure a first temperature of a first location proximate fault 46. For example, sensors 432 may include a first infrared detector (or camera), which may be configured to measure a temperature of the first location, which may be proximate a first portion of fault 46.

Sensors 432 may be configured to measure a second temperature of a second location proximate fault 46. For example, sensors 432 may include a second infrared detector (or camera), which may be configured to measure a temperature of the second location, which may be proximate a second portion of fault 46. The first location may be spaced apart from the second location.

The circuity of apparatus 410 may be configured to modulate emission of ultrasonic sound waves from the ultrasonic heater 420 based on the first and second temperatures.

In some embodiments, a single detector may be configured to measure temperature in both the first and second locations. For example, the single detector may be a single infrared camera configured to acquire a thermal image of the repair area 150 on the surface. The circuitry may receive the acquired thermal image, and may associate distinct first and second regions in the image with the respective first and second locations. The circuitry may modulate emissions from the array of heaters associated with apparatus 410 based on a temperature determined from the first region of the image, and/or may modulate emissions from the array of heaters associated with apparatus 410 based on a temperature determined from the second region of the image.

Translation assembly 424 may include a first set of towers 438 which may support a first track 440 and a second set of towers 442 which may support a second track 444. The first and second set of tower may releasably couple apparatus 410 to object 40. For example, the first and second set of towers may include suction cup devices capable of removably securing apparatus 410 to object 40 so that apparatus 410 may later be removed from object 40 without having damaged the surface. Translation assembly 424 may include a crossbar 446 supported by the first and second tracks. Translation assembly 424 may include a translation subassembly 448 capable of moving the ultrasonic heater back and forth along crossbar 446, that is, in direction 126 depicted in FIG. 3C.

The first and second tracks 440 and 444 may aligned substantially parallel to surface 44 even if surface 44 is curved as depicted in FIGS. 6A and 6B. The first and second tracks may be flexible or may be articulated at joints corresponding to the first and second towers. In any case, apparatus 410 may be able to attach to surfaces of different curvature, indicated at 44 and in dashed lines at 44' in FIG. 6B.

Example 3

This example describes an illustrative method for determining the heating parameters for bonding materials, which may be used in conjunction with any of the apparatuses described herein; see FIG. 7.

FIG. 7 depicts multiple steps of a method, generally indicated at 500 for determining the heating parameters for bonding materials. Method 500 may be used by any of the modeling modules depicted in and described in reference to FIG. 1, 3C, 3D, 4C, or 5. Although various steps of method 500 are described below and depicted in FIG. 7, the steps need not necessarily all be performed, and in some cases may be performed in a different order than the order shown.

Method 500 may include a step 502 of defining a repair area. Defining the repair area may involve capturing an image of an object with a visible camera. The image may include the defect to be repaired. The repair area may be determined by a user based on information in the captured image. The repair area may be defined by a patch that may be applied to the defect or the repair area may be larger than the patch. The repair area may include the surface of the object and layers, components, and other materials inside the object below the surface. The repair area may include a bond interface to be heated between a patch and a surface feature such as the defect as well as other components to which heat should not be applied or applied minimally.

Method 500 may include a step 504 of evaluating a set of repair parameters and providing the set of repair parameters to a lookup table. Evaluating a set of repair parameters may include evaluating, for example, the surface area of the repair area, the thickness of the materials in the repair area, the depth at which a bonding zone exists between materials, the number of plies of reinforcement material included in the repair area, the kind of materials included in the repair area, the boundary conditions for each of the materials included in the repair area, the shape of the materials included in the repair area, and others. The set of repair parameters may be evaluated by a computer or by a user. The modeling module may include a lookup table. The lookup table may include data regarding the thermal response of various materials under various conditions to various inputs of energy in the form of sound waves. The data included in the lookup table may have been created by a computer simulation modeling the thermal response of the respective materials. The set of repair parameters may be provided to the lookup table in order to increase the efficiency of the calculations completed by the modeling module.

Method 500 may include a step 506 of calculating a set of heating parameters with a computer. Calculating the set of heating parameters may be completed using a finite element analysis algorithm. The finite element analysis algorithm may create a predictive thermal map of the repair area based on data from the lookup table of step 504. The algorithm may also take other factors as inputs, such as the efficiency with which sound waves enter the object or the patch from the heating apparatus. Finite element analysis is known to model mathematical equations such as those that describe the flow of heat through and object and the propagation of waves through an object in potentially complex geometries such as may be present in the repair area. The computer may determine at step 506 a set of heating parameters for one or more ultrasonic heating elements, for example, a power of ultrasonic sound waves, a frequency of ultrasonic sound waves, a trajectory through the repair area of one ore\ more ultrasonic heaters, and, in the case of more than one ultrasonic heater, the relative phases of the sound waves from the more than one ultrasonic heater, among others. Step 506 may be completed before the repair has begun. Alternately, step 506 may be completed more than once, including before the repair has begun and while the repair is being completed. For example, the finite element analysis algorithm used to determine the set of heating parameters may take the temperature of the repair area as an input and the temperature of the repair area could be measured before the repair has begun and/or while the repair is being completed. The set of heating parameters calculated by the computer may change as the repair moves through various phases, see FIG. 8 below.

Method 500 may include a step 508 of sending the set of heating parameters to a controller. The controller may be responsible for operating the one or more ultrasonic heating elements according to the parameters calculated by the computer at step 506. Step 508 may be completed every time that step 506 is completed.

Method 500 may include a step 510 of beginning thermal curing. Once the controller is in possession of the set of heating parameters determined at step 506 the controller can power the one or more ultrasonic heating elements and a translation assembly capable of moving the one or more ultrasonic heating elements around in three dimensions in the repair area.

Example 4

This example describes an illustrative cure cycle (or process) for bonding materials, which may be used in conjunction with any of the apparatuses described herein; see FIG. 8.

FIG. 8 shows a chart of an illustrative cure cycle, generally indicated at 600. Cycle 600 may include a heat ramp-up phase 604, a dwell phase 608, and a cool down phase 612.

Prior to cycle 600, materials may be prepared to be bonded together at a bond interface in a bonding zone, which may involve preparing a damaged area and/or applying a patch. A vacuum bag, or other pressure reduction device, may be applied to the bonding zone to hold the materials together. An apparatus for bonding the materials may be used to define the bonding zone. In some embodiments, the vacuum bag may be placed over the apparatus (e.g., after the apparatus has defined the bonding zone). Phase 604 may begin at a first predetermined temperature (e.g., of a bond interface defined between the materials), such as at 54 degrees Celsius. In some embodiments, sound waves from the apparatus of any of the foregoing examples may be used to heat the bond interface. In some embodiments, the materials (and/or the bond interface) may be initially heated by another source, such as a heat gun, which may be used to heat tack an adhesive layer and/or the materials in place. Phase 604 may involve increasing the temperature of the bond interface at a first predetermined rate, such as at a rate in a range of about 0.5 to 3 degrees Celsius per minute.

Phase 604 may continue until the bond interface reaches a second predetermined temperature, which may be a cure (or cured) temperature of the bond interface, such as a temperature of 177 degrees Celsius plus or minus 6 degrees Celsius.

Phase 608 may begin when the bond interface reaches the second predetermined temperature. Phase 608 may involve holding or maintaining the second predetermined temperature for a predetermined duration of time, such as 150 to 210 minutes. Maintaining the second predetermined temperature for the predetermined duration of time may form a suitable bond between the materials (e.g., at the bond interface).

Phase 612 may start when the predetermined duration of time has lapsed. Phase 612 may involve decreasing the temperature of the bond interface at a second predetermined rate, such as at a rate that is less than or equal to 3 degrees Celsius per minute. The second predetermined rate may be a maximum rate at which the temperature of the bond interface can be reduced without reducing a strength of the bond. Phase 612 may continue until the bond interface reaches a third predetermined temperature, such as a temperature at or below 60 degrees Celsius. Once the bond interface has reached the third predetermined temperature, pressure inside the vacuum bag may be released, the vacuum bag and the apparatus may be removed, and the bond between the materials may be inspected.

Example 5

This example describes a method for bonding materials; see FIGS. 9-12.

FIG. 9 depicts multiple steps of a method, generally indicated at 700, which may be performed in conjunction with an apparatus for bonding materials according to aspects of the present disclosure. Although various steps of method 700 are described below and depicted in FIG. 9, the steps need not necessarily all be performed, and in some cases may be performed in a different order than the order shown.

Method 700 may include a step 702 of preparing a bonding zone. At step 702, a surface feature of an object may be prepared to be bonded with a new surface feature. The surface feature may be a fault in the object, or may be a region without a fault. Preparing the surface feature may involve removing a portion of material from the object, applying the new surface feature to the (existing) surface feature of the object, and/or vacuum bagging and depressurizing a region in which the new surface feature is disposed to hold together the new surface feature and the surface feature of the object. At step 702, an apparatus may be applied to the object to define the bonding zone. The apparatus may include an ultrasonic heating device, such as one or more piezoelectric heaters, and a translation assembly.

Method 700 may include a step 704 of performing a heat ramp-up phase, a step 706 of performing a dwell phase, and a step 708 of performing a cool down phase (e.g., similar to phases 604, 608, 612 shown in FIG. 8). At step 704, the apparatus may be configured and/or operated to increase at a first rate a temperature of a bond interface between the surface feature of the object and the new surface feature until the temperature of the bond interface reaches a first predetermined temperature (e.g., see phase 604 of FIG. 8). The first predetermined temperature may be a cured temperature of the bond interface. At step 706, the apparatus may be configured and/or operated to maintain a temperature of the bond interface at (or around) the first predetermined temperature for a predetermined duration of time (e.g., see phase 608 of FIG. 8). At step 708, the apparatus may be configured and/or operated to allow the temperature of the bond interface to decrease at a second predetermined rate until the bond interface reaches a second predetermined temperature (e.g., see phase 612 of FIG. 8).

Method 700 may include a step 710 of inspecting a bond formed between the material (e.g., the new surface feature and the surface feature of the object). At step 710, a user may remove the apparatus from the surface of the object, remove the vacuum bag, and inspect the bond to see if the apparatus has adequately heated the bond interface to provide a desirable cure.

FIG. 10 is an illustration of operations, generally indicated at 800, which may be performed by one embodiment of a feedback loop for the non-conductive heat ramp-up phase. This feedback loop may be implemented in circuitry of the apparatus.

Operations 800 may include a step 802 of acquiring a surface temperature reading. The surface temperature reading may include a measurement of the surface temperature of the surface feature of the object and/or the new surface feature, which may be proximate the bond interface. One or more temperature sensors of the apparatus may acquire the surface temperature reading. A controller, or other suitable circuitry of the apparatus, may receive the surface temperature reading from the one or more temperature sensors.

Operations 800 may include a step 804 of converting the surface temperature to an inner ply temperature. The one or more ultrasonic heaters may heat the bond interface via directed ultrasonic sound waves. The sound waves may be converted to heat, either by friction at interfaces between different parts or by internal friction within the composite fiber materials themselves as the sound waves travel from the surface into and through the materials. Thus, heat may be applied to a bond portion (e.g., an adhesive) of the bond interface, which may be in a non-exposed location. For example, bond interface 208 in FIG. 4B may correspond to a location of an inner ply of the bond interface that is non-exposed. Heat applied to the materials in this non-exposed location may be conductively transmitted to other portions of the bond interface. Heat conductively transmitted to exposed portions of the bond interface (e.g., the horizontal portion of bond interface 190 in FIG. 4C), may be convectively dissipated. However, heat conductively transmitted to other non-exposed portions of the bond interface (e.g., a lower segment of the angled portion of bond interface 190 in FIG. 4C) may not be convectively dissipated, which may result in the inner ply temperature being higher than the surface temperature. At step 804, the circuitry of the apparatus (e.g., the controller, a data processing system, and/or a modeling module) may determine the inner ply temperature based on the measured surface temperature. The determined inner ply temperature may be an estimate, based on one or more factors, such as bond interface topography, a depth of the bond interface, and/or compositions of the materials being bonded. The circuitry may determine the inner ply temperature by accessing a conversion table or a lookup table. The conversion table may associate specific surface temperatures with specific predetermined inner ply temperatures.

Operations 800 may include a step 806 of determining whether the inner ply temperature is equal to (or has reached) the cured temperature. In some examples, the cured temperature may be around 177 degrees Celsius. In other examples, the cured temperature may be around 121 degrees Celsius. At step 806, the circuitry of the apparatus may determine whether the inner ply temperature is equal to (or has reached) the cured temperature. If it is determined that the inner ply temperature has reached the cured temperature, then operations 800 may flow to a step 808 of proceeding to the dwell phase (e.g., see phase 608 in FIG. 8, and step 706 in FIG. 9). However, if it is determined at step 806 that the inner ply temperature is not equal to (e.g., is less than) the cured temperature, then operations 800 may proceed to a step 810. At step 810, the circuitry may determine whether an inner ply temperature rate increase is less than a first predetermined threshold rate, such as 0.5 degrees Celsius per minute. If it is determined at step 810 that the rate increase is less than the first predetermined threshold rate, then operations 800 may proceed to a step 812 of increasing power to one or more of the ultrasonic heaters, and may return to step 802. If it is determined at step 810 that the rate increase is not less than the first predetermined threshold rate, then operations 800 may proceed to a step 814.

At step 814, the circuitry may determine whether the inner ply temperature rate increase is greater than a second predetermined threshold rate, such as 3 degrees Celsius per minute. If it is determined at step 814 that the inner ply temperature rate increase is not greater than the second predetermined threshold rate, then operations 800 may return to step 802. However, if it is determined at step 814 that the inner ply temperature rate increase is greater than the second predetermined threshold rate, then operations 800 may proceed to a step 816 of decreasing power to one or more of the ultrasonic heaters, and may return to step 802.

FIG. 11 is an illustration of operations, generally indicated at 900, which may be performed by one embodiment of a feedback loop for the dwell phase. This feedback loop may be implemented in the circuitry of the apparatus.

Operations 900 may include a step 902 of acquiring a surface temperature reading, and a step 904 of converting the acquired surface temperature to an inner ply temperature. Step 902 may be similar to step 802 of operations 800. Step 904 may be similar to step 804 of operations 800.

Operations 900 may include a step 906 of determining whether the inner ply temperature is less than a lower threshold temperature. The lower threshold temperature may be the cured temperature (or a lower predetermined temperature in a range of temperatures at which the bond interface may be properly cured). If it is determined at step 906 that the inner ply temperature is less than the lower threshold temperature, then operations 900 may proceed to a step 908 of increasing power to one or more of the ultrasonic heaters, and return to step 902.

However, it is determined at step 906 that the inner ply temperature is not less than the lower threshold temperature, then operations 900 may proceed to a step 910 of determining whether an elapsed time in the dwell phase has reached (or is equal to) a predetermined duration of dwell time. The predetermined duration of dwell time may be a duration of dwell time that is required for the bond interface to be properly cured.

If it is determined at step 910 that the elapsed time has not reached the predetermined duration, then operations 900 may proceed to a step 912 of determining whether the inner ply temperature is greater than an upper threshold temperature. The upper threshold temperature may be an upper predetermined temperature in a range of temperatures at which the bond interface may be properly cured. If it is determined at step 912 that the inner ply temperature is greater than the upper threshold temperature, then operations 900 may proceed to a step 914 of decreasing power to one or more of the ultrasonic heaters, and return to step 902. However, if it is determined at step 912 that the inner ply temperature is not greater than the upper threshold temperature, then operations may return to step 902 (e.g., without decreasing power to one or more of the ultrasonic heaters).

At step 910, if it is determined that the elapsed time has reached the predetermined duration, then operations 900 may flow to a step 916 of proceeding to the cool down phase (e.g., see phase 612 in FIG. 8, and step 708 in FIG. 9).

FIG. 12 is an illustration of operations, generally indicated at 1000, which may be performed by one embodiment of a feedback loop for the cool down phase. This feedback loop may be implemented in the circuitry of the apparatus.

Operations 1000 may include a step 1002 of acquiring a surface temperature reading, and a step 1004 of converting the acquired surface temperature to an inner ply temperature. Step 1002 may be similar to step 802 of operations 800. Step 1004 may be similar to step 804 of operations 800.

Operations 1000 may include a step 1006 of determining whether an inner ply temperature rate decrease is less than a third predetermined threshold rate. The third predetermined threshold rate may be a rate at which the inner ply temperature may decrease without damaging the cured bond. For example, the third predetermined threshold rate may be 3 degrees Celsius per minute. If it is determined at step 1006 that the inner ply temperature rate decrease is not less than the third predetermined threshold rate, then operations 1000 may proceed to a step 1008 of decreasing power to one or more of the ultrasonic heaters, and may return to step 1002. However, if it is determined at step 1006 that the inner ply temperature decrease is not less than the third predetermined threshold rate, then operations 1000 may proceed to a step 1010 of determining whether the inner ply temperature is less than or equal to a suitably cool temperature, such as 60 degrees Celsius. The suitably cool temperature may be a temperate at or below which the temperature of the cured bond interface can decrease at a rate greater than the third predetermined threshold rate without causing damage to the cured bond.

At step 1010, if it is determined that the inner ply temperature is not less than or equal to the suitably cool temperature, then operations 1000 may return to step 1002. However, if it is determined at step 1010 that the inner ply temperature is less than or equal to the suitably cool temperature, then operations 1000 may proceed to a step 1012 of turning off power to the one or more ultrasonic heaters.

Example 6

This example describes another method for bonding materials; see FIG. 13.

FIG. 13 depicts multiple steps of a method, generally indicated at 1100, which may be performed in conjunction with an apparatus for bonding materials according to aspects of the present disclosure. Although various steps of method 1100 are described below and depicted in FIG. 13, the steps need not necessarily all be performed, and in some cases may be performed in a different order than the order shown.

Method 1100 may include a step 1102 of defining a bond interface between two materials in a cure zone on a surface of an object. A patch may be created by bonding together multiple plies of composite material. At step 1102, a surface feature of the object may be prepared to be bonded with the patch. Preparation of the surface feature may involve sanding, grinding, or otherwise removing some material from the surface feature. The surface feature may be associated with the surface and may be one of the two materials. At least one of the two materials may be one of a composite material, a ceramic material, or a fiberglass material. The surface feature may include an indentation in the surface. The surface feature may include a hole through a wall. The patch may be the other of the two materials. Defining the bond interface may include applying a thermo-setting adhesive between the patch and the prepared surface feature. The extent of the cure zone may depend upon data taken with a visible camera.

Method 1100 may include a step 1106 of heating the bond interface with sound waves. Heating the bond interface may involve applying ultrasonic sound waves to the bond interface and/or materials proximate the bond interface. The ultrasonic sound waves applied to the bond interface may be emitted from one or more piezoelectric heaters. Heating the bond interface may include movies the one or more piezoelectric heaters around in three spatial dimensions, for example, via a translation assembly as described above in reference to FIG. 3C. Heating the bond interface may include adjusting a relative phase of the sound waves emitted from the one or more piezoelectric heaters.

Method 1100 may include a step 1108 of determining a temperature in a location in the cure zone, and modifying a heating effect at the location in response to the determined temperature. For example, step 1108 may involve determining a temperature of the bond interface with a temperature sensor, and modulating emission of the ultrasonic sound waves from at least a subset of the piezoelectric heaters based on the determined temperature. Step 1108 of determining the temperature is depicted in FIG. 13 as occurring after step 1106 of heating the bond interface. However, steps 1108 and 1106 need not occur in only this order. Step 1108 may occur before, during, or after step 1106. Steps 1106 and 1108 may each occur multiple times during the bonding of the two materials as elements of a loop as depicted in FIGS. 10-12. The temperature sensor used to determine the temperature of the bond interface may be an infrared camera.

Some examples of method 1100 may include an optional step 1104 of determining heating parameters by modeling the temperature response in the cure zone with a finite element algorithm. Optional step 1104 may be completed before step 1106, concurrently with step 1106, or both before and concurrently with step 1106. One of the inputs for determining the heating parameters may be the current temperature at various locations in the cure zone. Thus, optional step 1104 may be completed before, concurrently with, or after step 1108.

Example 7

This example describes another method for bonding materials; see FIG. 14.

FIG. 14 depicts multiple steps of a method, generally indicated at 1200, which may be performed in conjunction with an apparatus for bonding materials according to aspects of the present disclosure. Although various steps of method 1200 are described below and depicted in FIG. 14, the steps need not necessarily all be performed, and in some cases may be performed in a different order than the order shown.

Method 1200 may include a step 1202 of defining a bonding zone on a surface of an object. The surface may include a deformity to be repaired. The surface may be the surface of a pre-existing composite material. The pre-existing composite material may have been previously cured.

Method 1200 may include a step 1204 of providing a patch material adjacent the deformity. The patch may include matrix material and/or reinforcement material. The patch material provided adjacent the deformity may be in a cured state, or may be in a non-cured state.

Method 1200 may include a step 1206 of deploying at least one ultrasonic piezoelectric heater in proximity to the bonding zone. The at least one piezoelectric heater may be held in proximity to the bonding zone by a translation assembly. The at least one piezoelectric heater may be a single heater or more than one heater. In the case that there are more than one piezoelectric heaters, the heaters may be arranged in a one-dimensional array or a two dimensional array.

Method 1200 may include a step 1210 of emitting ultrasonic sound waves to the bonding zone until the patch is suitably bonded to the object. Suitably bonding the patch to the object may involve emitting ultrasonic sound waves from the at least one piezoelectric heater to the bonding zone to perform a heat ramp-up phase, a dwell phase, and a cool down phase on the bond interface. In some embodiments, emitting ultrasonic sound waves may include moving at least one of the piezoelectric heaters around in three spatial dimensions concurrently with the emitting. The moving of the at least one of the piezoelectric heaters may be accomplished with the translation assembly. In some embodiments, if there is more than one piezoelectric heater, emitting ultrasonic sound waves may include controlling the relative phase of the sound waves from the more than piezoelectric heaters in order to manipulate the direction of the sound waves in the object. The emission of ultrasonic sound waves into the bonding zone need not be done in a constant manner until the patch is suitable bonded to the object. That is, the parameters of the one or more piezoelectric heaters, including but not limited to, the power, frequency, location, and relative phase of the one or more heaters may change with time during step 1210. For example, one or more of the heating parameters may change as the result of a feedback loop, see for example, FIGS. 10-13. As a part of such a feedback loop, the temperature of the bond interface may be determined with a temperature sensor, and the emission of the ultrasonic sound waves from at least a subset of the piezoelectric heaters may be modulated based on the determined temperature.

Some examples of method 1200 may include an optional step 1208 of determining heating parameters by modeling the temperature response in the bonding zone with a finite element algorithm. Optional step 1208 may be completed before step 1210, concurrently with step 1210, or both before and concurrently with step 1210. One of the inputs for determining the heating parameters may be the current temperature at various locations in the cure zone. Step 1208 may be completed before or after step 1206. Step 1208 may be completed before or after step 1204.

Example 8

This example describes a data processing system 1500 in accordance with aspects of the present disclosure. In this example, data processing system 1500 is an illustrative data processing system for implementing one or more of the operations and/or functions in FIGS. 1-14 and/or described in relation thereto; see FIG. 15.

In this illustrative example, data processing system 1500 includes communications framework 1502. Communications framework 1502 provides communications between processor unit 1504, memory 1506, persistent storage 1508, communications unit 1510, input/output (I/O) unit 1512, and display 1514. Memory 1506, persistent storage 1508, communications unit 1510, input/output (I/O) unit 1512, and display 1514 are examples of resources accessible by processor unit 1504 via communications framework 1502.

Processor unit 1504 serves to run instructions for software that may be loaded into memory 1506. Processor unit 1504 may be a number of processors, a multi-processor core, or some other type of processor, depending on the particular implementation. Further, processor unit 1504 may be implemented using a number of heterogeneous processor systems in which a main processor is present with secondary processors on a single chip. As another illustrative example, processor unit 1504 may be a symmetric multi-processor system containing multiple processors of the same type.

Memory 1506 and persistent storage 1508 are examples of storage devices 1516. A storage device is any piece of hardware that is capable of storing information, such as, for example, without limitation, data, program code in functional form, and other suitable information either on a temporary basis or a permanent basis.

Storage devices 1516 also may be referred to as computer readable storage devices in these examples. Memory 1506, in these examples, may be, for example, a random access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 also may be removable. For example, a removable hard drive may be used for persistent storage 1508.

Communications unit 1510, in these examples, provides for communications with other data processing systems or devices. In these examples, communications unit 1510 is a network interface card. Communications unit 1510 may provide communications through the use of either or both physical and wireless communications links.

Input/output (I/O) unit 1512 allows for input and output of data with other devices that may be connected to data processing system 1500. For example, input/output (I/O) unit 1512 may provide a connection for user input through a keyboard, a mouse, and/or some other suitable input device. Further, input/output (I/O) unit 1512 may send output to a printer. Display 1514 provides a mechanism to display information to a user.

Instructions for the operating system, applications, and/or programs may be located in storage devices 1516, which are in communication with processor unit 1504 through communications framework 1502. In these illustrative examples, the instructions are in a functional form on persistent storage 1508. These instructions may be loaded into memory 1506 for execution by processor unit 1504. The processes of the different embodiments may be performed by processor unit 1504 using computer-implemented instructions, which may be located in a memory, such as memory 1506.

These instructions are referred to as program instructions, program code, computer usable program code, or computer readable program code that may be read and executed by a processor in processor unit 1504. The program code in the different embodiments may be embodied on different physical or computer readable storage media, such as memory 1506 or persistent storage 1508.

Program code 1518 is located in a functional form on computer readable media 1520 that is selectively removable and may be loaded onto or transferred to data processing system 1500 for execution by processor unit 1504. Program code 1518 and computer readable media 1520 form computer program product 1522 in these examples. In one example, computer readable media 1520 may be computer readable storage media 1524 or computer readable signal media 1526.

Computer readable storage media 1524 may include, for example, an optical or magnetic disk that is inserted or placed into a drive or other device that is part of persistent storage 1508 for transfer onto a storage device, such as a hard drive, that is part of persistent storage 1508. Computer readable storage media 1524 also may take the form of a persistent storage, such as a hard drive, a thumb drive, or a flash memory, that is connected to data processing system 1500. In some instances, computer readable storage media 1524 may not be removable from data processing system 1500.

In these examples, computer readable storage media 1524 is a physical or tangible storage device used to store program code 1518 rather than a medium that propagates or transmits program code 1518. Computer readable storage media 1524 is also referred to as a computer readable tangible storage device or a computer readable physical storage device. In other words, computer readable storage media 1524 is a media that can be touched by a person.

Alternatively, program code 1518 may be transferred to data processing system 1500 using computer readable signal media 1526. Computer readable signal media 1526 may be, for example, a propagated data signal containing program code 1518. For example, computer readable signal media 1526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1518 may be downloaded over a network to persistent storage 1508 from another device or data processing system through computer readable signal media 1526 for use within data processing system 1500. For instance, program code stored in a computer readable storage medium in a server data processing system may be downloaded over a network from the server to data processing system 1500. The data processing system providing program code 1518 may be a server computer, a client computer, or some other device capable of storing and transmitting program code 1518.

The different components illustrated for data processing system 1500 are not meant to provide architectural limitations to the manner in which different embodiments may be implemented. The different illustrative embodiments may be implemented in a data processing system including components in addition to and/or in place of those illustrated for data processing system 1500. Other components shown in FIG. 15 can be varied from the illustrative examples shown. The different embodiments may be implemented using any hardware device or system capable of running program code. As one example, data processing system 1500 may include organic components integrated with inorganic components and/or may be comprised entirely of organic components excluding a human being. For example, a storage device may be comprised of an organic semiconductor.

In another illustrative example, processor unit 1504 may take the form of a hardware unit that has circuits that are manufactured or configured for a particular use. This type of hardware may perform operations without needing program code to be loaded into a memory from a storage device to be configured to perform the operations.

For example, when processor unit 1504 takes the form of a hardware unit, processor unit 1504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1518 may be omitted, because the processes for the different embodiments are implemented in a hardware unit.

In still another illustrative example, processor unit 1504 may be implemented using a combination of processors found in computers and hardware units. Processor unit 1504 may have a number of hardware units and a number of processors that are configured to run program code 1518. With this depicted example, some of the processes may be implemented in the number of hardware units, while other processes may be implemented in the number of processors.

In another example, a bus system may be used to implement communications framework 1502 and may be comprised of one or more buses, such as a system bus or an input/output bus. Of course, the bus system may be implemented using any suitable type of architecture that provides for a transfer of data between different components or devices attached to the bus system.

Additionally, communications unit 1510 may include a number of devices that transmit data, receive data, or both transmit and receive data. Communications unit 1510 may be, for example, a modem or a network adapter, two network adapters, or some combination thereof. Further, a memory may be, for example, memory 1506, or a cache, such as that found in an interface and memory controller hub that may be present in communications framework 1502.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the Figures. For example, the functions of two blocks shown in succession may be executed substantially concurrently, or the functions of the blocks may sometimes be executed in the reverse order, depending upon the functionality involved.

Example 9

This section describes additional aspects and features of embodiments, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A method of bonding materials, comprising:
defining a bond interface between two materials in a cure zone on a surface of an object; and
heating the bond interface with sound waves.

A1. The method of paragraph A0, wherein heating the bond interface includes applying ultrasonic sound waves to the bond interface.

A2. The method of any one paragraph of paragraphs A0-A1, wherein heating the bond interface includes applying ultrasonic sound waves and emitting the ultrasonic sound waves from one or more piezoelectric heaters.

A3. The method of any one paragraph of paragraphs A0-A2, further comprising determining a temperature of the bond interface with a temperature sensor, and modulating emission of the ultrasonic sound waves the one or more piezoelectric heaters based on the determined temperature.

A4. The method of any one paragraph of paragraphs A0-A3, wherein the defining a bond interface step includes applying a thermosetting adhesive between the two materials.

A5. The method of any one paragraph of paragraphs A0-A4, further comprising preparing a surface feature to be bonded with a patch, wherein the surface feature is associated with the surface and is one of the two materials, the patch being the other of the two materials.

A6. The method of any one paragraph of paragraphs A0-A5, wherein the bond interface is adjacent a surface feature including an indentation in the surface or a hole through a wall in the cure zone.

A7. The method of any one paragraph of paragraphs A0-A6, further comprising creating a patch for the surface feature by bonding together multiple plies of composite material.

A8. The method of any one paragraph of paragraphs A0-A7, wherein heating the bond interface includes moving the one or more piezoelectric heaters in three spatial dimensions.

A9. The method any one paragraph of paragraphs A0-A8, wherein the heating the bond interface step includes adjusting a relative phase of the sound waves emitted from the one or more piezoelectric heaters.

A10. The method of any one paragraph of paragraphs A0-A9, further comprising determining heating parameters by modeling the temperature response in the cure zone with a finite element algorithm.

A11. The method of any one paragraph of paragraphs A0-A10, wherein determining heating parameters by modeling the temperature response in the cure zone with a finite element algorithm is done before heating the bond interface.

A12. The method of any one paragraph of paragraphs A0-A11, wherein determining heating parameters by modeling the temperature response in the cure zone with a finite element algorithm is done concurrently with heating the bond interface.

A13. The method of any one paragraph of paragraphs A0-A12, wherein determining heating parameters by modeling the temperature response in the cure zone with a finite element algorithm is done before heating the bond interface and concurrently with heating the bond interface.

A14. The method of any one paragraph of paragraphs A0-A13, wherein the temperature sensor is an infrared camera.

A15. The method of any one paragraph of paragraphs A0-A14, wherein an extent of the cure zone depends upon data taken with a visible camera.

A16. The method of any one paragraph of paragraphs A0-A15, wherein at least one of the two materials is one of a composite material, a ceramic material, or a fiberglass material.

B0. A method of bonding materials, comprising:
defining a bonding zone on a surface of an object, the surface including a deformity to be repaired;
providing a patch material adjacent the deformity;
deploying at least one ultrasonic piezoelectric heater in proximity to the bonding zone; and
emitting ultrasonic sound waves from the at least one piezoelectric heaters into the bonding zone until the patch is suitably bonded to the object.

B1. The method of paragraph B0, further comprising controlling a phase difference between the ultrasonic sound waves from a first piezoelectric heater and a second piezoelectric heater can be controlled.

B2. The method of any one paragraph of paragraphs B0-B1, further comprising moving at least one piezoelectric heater in three spatial dimensions, the moving executed concurrently with the emitting.

B3. The method of any one paragraph of paragraphs B0-B2, further comprising determining heating parameters by modeling the temperature response in the bonding zone with a finite element algorithm.

B4. The method of any one paragraph of paragraphs B0-B3, further comprising determining a temperature of the bond interface with a temperature sensor, and modulating emission of the ultrasonic sound waves from at least a subset of the piezoelectric heaters based on the determined temperature.

B5. The method of any one paragraph of paragraphs B0-B4, wherein one of the patch or the object is comprised of one of a composite material, a ceramic material, or a fiberglass material.

C0. An apparatus for bonding materials, comprising:
at least one piezoelectric heater configured to emit ultrasonic sound waves for bonding composite materials together in a defined cure zone;
a support structure configured to direct the waves toward the cure zone;
a temperature sensor for monitoring temperatures of composite materials in the cure zone; and
a controller configured to modulate properties of the heater based on temperature information received from the sensor.

C1. The apparatus of paragraph C0, wherein the support structure includes a translation assembly having a pair of flexible tracks and a rail configured to move along the flexible tracks, the at least one piezoelectric heater being attached to the rail.

C2. The apparatus of any one paragraph of paragraphs C0-C1, wherein the support structure includes a translation assembly capable of moving the at least one piezoelectric heater in three dimensions.

C3. The apparatus of any one paragraph of paragraphs C0-C2, wherein the temperature sensor includes an infrared camera configured to measure temperature at one or more locations in the cure zone.

C4. The apparatus of any one paragraph of paragraphs C0-C3, wherein the controller is configured to modulate emission of the ultrasonic sound waves from the piezoelectric heater.

C4. The apparatus of any one paragraph of paragraphs C0-C3, wherein the controller is configured to modulate position of the piezoelectric heater relative to the cure zone.

C5. The apparatus of any one paragraph of paragraphs C0-C4, wherein the controller is configured to modulate a rate of movement of the piezoelectric heater relative to the cure zone.

Manner of Operation/Use

In one example, a damaged area may be identified on a surface of a composite material of an object, such as an airplane, a bicycle, or other object. The damaged area may be prepared for repair by removing a portion of the composite material from the damaged area. A patch may be applied to the prepared damaged area. A vacuum bag may be used to evacuate a space in which the patch and the prepared damaged area are disposed. An apparatus including a translation assembly and one or more ultrasonic heaters may be mounted to the surface of the object, such that the one or more ultrasonic heaters are adjacent the surface. The apparatus may be operated to emit ultrasonic sound waves from the one or more ultrasonic heaters to a bond interface between the patch and prepared damaged area. The translation assembly may be configured to move the one or more ultrasonic heaters around in three dimensions as the heaters emit ultrasonic sound waves into the object. Circuitry of the apparatus may adjust the emitted sound waves to control a temperature of the bond interface in a heat ramp-up phase, a dwell phase, and a cool down phase to suitably bond the patch to the prepared damaged surface. The circuitry may indicate to a technician when the cool down phase has been complete. The technician may remove the apparatus from the surface, remove the vacuum bag, and inspect the bond between the patch and the object.

Alternatively, the apparatus may be used to bond any composite materials for any purpose, such as constructing new articles of manufacture, such as on an assembly line.

Advantages, Features, Benefits

The different embodiments described herein provide several advantages over known solutions for bonding materials. For example, the illustrative embodiments described herein allow a bond interface between an existing surface feature of an object and a new surface feature to be heated directly via directed ultrasonic sound waves, rather than conductively, which may provide for improved control of bond interface temperature, improved heat distribution along the bond interface, a reduction of misplaced heating, improved heating speeds, shortened cure times, and/or prevention of thermal runaways. However, not all embodiments described herein provide the same advantages or the same degree of advantage.

CONCLUSION

The disclosure set forth above may encompass multiple distinct disclosures with independent utility. Although each of these disclosures has been disclosed in its preferred form(s), the specific embodiments thereof as disclosed and illustrated herein are not to be considered in a limiting sense, because numerous variations are possible. The subject matter of the disclosures includes all novel and nonobvious combinations and subcombinations of the various elements, features, functions, and/or properties disclosed herein. The following claims particularly point out certain combinations and subcombinations regarded as novel and nonobvious. Disclosures embodied in other combinations and subcombinations of features, functions, elements, and/or properties may be claimed in applications claiming priority from this or a related application. Such claims, whether directed to a different disclosure or to the same disclosure, and whether broader, narrower, equal, or different in scope to the original claims, also are regarded as included within the subject matter of the disclosures of the present disclosure.

We claim:

1. A method of bonding materials, comprising:
defining a bond interface between two materials in a cure zone on a surface of an object, where the bond interface includes a thermosetting adhesive disposed between the two materials;
heating the bond interface with sound waves;
measuring a surface temperature on the surface of the material to be bonded to determine if a cure temperature has been reached for at least a duration of time, such that the thermosetting adhesive is cured, thereby bonding the two materials; and
after the duration of time has elapsed, decreasing the temperature of the bond interface at a predetermined rate that does not exceed a maximum rate at which the temperature of the bond interface can be reduced without reducing strength of the bond.

2. The method of claim 1, wherein heating the bond interface includes applying ultrasonic sound waves and emitting the ultrasonic sound waves from one or more piezoelectric heaters.

3. The method of claim 2, further comprising determining a temperature of the bond interface with a temperature sensor, and modulating emission of the ultrasonic sound waves from the one or more piezoelectric heaters based on the determined temperature.

4. The method of claim 1, wherein the bond interface is adjacent a surface feature including an indentation in the surface or a hole through a wall in the cure zone.

5. The method of claim 4, further comprising creating a patch for the surface feature by bonding together multiple plies of composite material.

6. The method of claim 2, wherein heating the bond interface includes moving the one or more piezoelectric heaters in three spatial dimensions.

7. The method of claim 2, wherein heating the bond interface includes adjusting a relative phase of the sound waves emitted from the one or more piezoelectric heaters.

8. The method of claim 1, further comprising determining heating parameters by modeling the temperature response in the cure zone with a finite element algorithm.

9. The method of claim 1 wherein the method further comprises reducing the temperature at a predetermined rate that is less than or equal to 3 degrees Celsius per minute.

10. The method of claim 1, wherein one of the two materials comprises a number of plies, and measuring a surface temperature further comprises the steps of determining an inner ply temperature estimate by associating the surface temperature with a predetermined inner ply temperature, and determining if the inner ply temperature estimate has reached the cure temperature for at least the duration of time.

11. The method of claim 10, wherein determining an inner ply temperature estimate comprises determining an inner ply temperature estimate based on a depth of the bond interface, by associating the surface temperature with a predetermined inner ply temperature.

12. A method of bonding materials, comprising:
defining a bonding zone on a surface of an object, the surface including a deformity to be repaired;
providing a patch material adjacent the deformity;
applying a thermosetting adhesive in the bonding zone disposed between the surface and the patch material;
deploying at least one ultrasonic piezoelectric heater in proximity to the bonding zone;
emitting ultrasonic sound waves from the at least one piezoelectric heater into the bonding zone;
measuring a surface temperature on the surface of the patch material to be bonded to determine if a cure temperature has been reached, for at least a duration of time to cure the thermosetting adhesive until the patch is suitably bonded to the object; and p1 after the duration of time has elapsed, decreasing the temperature of the bonding zone at a predetermined rate that does not exceed a maximum rate at which the temperature of the bonding zone can be reduced without reducing strength of the bond.

13. The method of claim 12, further comprising controlling a phase difference between the ultrasonic sound waves from a first piezoelectric heater and a second piezoelectric heater.

14. The method of claim 12, further comprising moving the at least one piezoelectric heater in three spatial dimensions, the moving executed concurrently with the emitting.

15. The method of claim 12, further comprising determining heating parameters by modeling the temperature response in the bonding zone with a finite element algorithm.

16. The method of claim 12, further comprising determining a temperature of the bonding zone with a temperature sensor, and modulating emission of the ultrasonic sound waves from the at least one piezoelectric heater based on the determined temperature.

17. The method of claim 12 wherein the method further comprises reducing the temperature at a predetermined rate that is less than or equal to 3 degrees Celsius per minute.

18. The method of claim 12, wherein the patch material comprises a number of plies, and measuring a surface temperature further comprises the steps of determining an inner ply temperature estimate by associating the surface temperature with a predetermined inner ply temperature, and determining if the inner ply temperature estimate has reached the cure temperature for at least the duration of time.

19. The method of claim 18, wherein determining an inner ply temperature estimate comprises determining an inner ply temperature estimate based on a depth of the bonding zone, by associating the surface temperature with a predetermined inner ply temperature.

20. An apparatus for bonding materials, comprising:
at least one piezoelectric heater configured to emit ultrasonic sound waves for bonding composite materials together in a defined cure zone;
a support structure configured to direct the waves toward the cure zone;
a temperature sensor for monitoring temperatures of composite materials in the cure zone; and
a controller configured to modulate properties of the heater based on temperature information received from the sensor and to determine from the sensed temperature of the material to be bonded if a cure temperature has been reached for at least a duration of time, where the controller is configured to decrease the temperature of the cure zone at a predetermined rate that does not exceed a maximum rate at which the temperature of the cure zone can be reduced without reducing strength of the bond.

21. The apparatus of claim 20, wherein the support structure includes a translation assembly having a pair of flexible tracks and a rail configured to move along the flexible tracks, the at least one piezoelectric heater being attached to the rail.

22. The apparatus of claim 20, wherein the support structure includes a translation assembly capable of moving the at least one piezoelectric heater in three dimensions.

23. The apparatus of claim 20, wherein the temperature sensor includes an infrared camera configured to measure temperature at one or more locations in the cure zone.

24. The apparatus of claim 20, wherein the controller is configured to modulate emission of the ultrasonic sound waves from the at least one piezoelectric heater.

25. The apparatus of claim 20, wherein the controller is configured to modulate position of the at least one piezoelectric heater relative to the cure zone.

* * * * *